United States Patent
Zheng et al.

(10) Patent No.: US 12,547,799 B2
(45) Date of Patent: Feb. 10, 2026

(54) REAL-TIME UPDATE OF POWER SYSTEM MODELS FOR DYNAMIC SECURITY ASSESSMENT

(71) Applicant: GENERAL ELECTRIC COMPANY, Schenectady, NY (US)

(72) Inventors: Gang Zheng, Surrey (CA); Honggang Wang, Clifton Park, NY (US); Manu Parashar, Seattle, WA (US)

(73) Assignee: GE DIGITAL HOLDINGS LLC, San Ramon, CA (US)

( * ) Notice: Subject to any disclaimer, the term of this patent is extended or adjusted under 35 U.S.C. 154(b) by 815 days.

(21) Appl. No.: 17/221,909

(22) Filed: Apr. 5, 2021

(65) Prior Publication Data
US 2022/0284156 A1 Sep. 8, 2022

Related U.S. Application Data

(60) Provisional application No. 63/157,856, filed on Mar. 8, 2021.

(51) Int. Cl.
*G06F 30/27* (2020.01)
*G06F 113/04* (2020.01)
(Continued)

(52) U.S. Cl.
CPC .............. *G06F 30/27* (2020.01); *G06N 20/00* (2019.01); *G06F 2113/04* (2020.01); *G06F 2119/06* (2020.01)

(58) Field of Classification Search
CPC .. G06F 2113/04; G06F 30/27; G06F 2119/06; G06N 20/00; G06N 5/04
See application file for complete search history.

(56) References Cited

U.S. PATENT DOCUMENTS

| | | | |
|---|---|---|---|
| 10,333,301 B2 | 6/2019 | Gubba Ravikumar | |
| 2013/0335058 A1* | 12/2013 | Mercer | H02J 1/06 |
| | | | 323/318 |
| 2018/0323611 A1* | 11/2018 | Gubba Ravikumar | |
| | | | G05B 17/02 |

FOREIGN PATENT DOCUMENTS

| | | | | |
|---|---|---|---|---|
| KR | 20170028147 A | * | 3/2017 | G06F 17/60 |
| WO | WO-2018120893 A1 | * | 7/2018 | G06Q 10/06393 |
| WO | WO-2020162937 A1 | * | 8/2020 | H02J 3/00 |

OTHER PUBLICATIONS

Morison, K. et al. Power system security assessment. 2004. IEEE power and energy magazine, 2(5), 30-39. (Year: 2004).*

(Continued)

*Primary Examiner* — Ryan F Pitaro
*Assistant Examiner* — Hein Jeong
(74) *Attorney, Agent, or Firm* — Buckley, Maschoff & Talwalkar LLC

(57) ABSTRACT

Provided is a system and method for updating dynamic power system models during each DSA analysis cycle. In one example, the method may include iteratively executing a dynamic security analysis (DSA) on a power grid based on a simulation of a dynamic power system model, receiving measurements from one or more sensors on the power grid, modifying one or more parameters of the dynamic power system model used in a previous iteration of the DSA based on the received measurements, simulating the modified dynamic power system model, determining a security value of the power grid during a current iteration of the DSA based on the simulated modified dynamic power system model, and storing the determined security value in memory.

20 Claims, 12 Drawing Sheets

(51) Int. Cl.
  *G06F 119/06*    (2020.01)
  *G06N 20/00*     (2019.01)

(56) References Cited

OTHER PUBLICATIONS

Huang, R. et al. Calibrating parameters of power system stability models using advanced ensemble Kalman filter. 2017. IEEE Transactions on Power Systems, 33(3), 2895-2905. (Year: 2017).*
Xu, Y. et al. "An intelligent dynamic security assessment framework for power systems with wind power." 2012. IEEE Transactions on Industrial Informatics 8(4), 995-1003. (Year: 2012).*
Shi, D. et al. An adaptive method for detection and correction of errors in PMU measurements. 2012. IEEE Transactions on Smart Grid, 3(4), 1575-1583. (Year: 2012).*
Duan, B. et al. Calibration methodology for energy management system of a plug-in hybrid electric vehicle. 2017. Energy conversion and management, 136, 240-248. (Year: 2017).*
Ejebe, G. C. et al. Online dynamic security assessment in an EMS. 1998. IEEE computer Applications in Power, 11(1), 43-47. (Year: 1998).*
Wang, L. et al. Implementation of online security assessment. 2006. IEEE Power and Energy Magazine, 4(5), 46-59. (Year: 2006).*
Salehi Pour Mehr, V. Development and Verification of Control and Protection Strategies in Hybrid AC/DC Power Systems for Smart Grid Applications. 2012. (Year: 2012).*
Khare, R. An operator assistant for emergency control of large-scale power systems. 1997. University of Washington. (Year: 1997).*

* cited by examiner

REAL-TIME UPDATE OF POWER SYSTEM MODELS FOR DYNAMIC SECURITY ASSESSMENT

CROSS-REFERENCE TO RELATED APPLICATIONS

This application claims the benefit of and claims priority to U.S. Provisional Patent Application No. 63/157,856, filed on Mar. 8, 2021, in the United States Patent and Trademark Office, which is incorporated herein by reference for all purposes.

BACKGROUND

Power system models, also referred to as dynamic power system models, are the foundation of virtually all power system studies. Calculation of operating limits, planning for assessment of new generation and load growth, performance assessments of system integrity protection schemes (SIPS), and the like, depend on an approximate mathematical representation of the transmission, generation, and load of an electrical grid which can be created by power system models. Power system models can be simulated for a number of different analyses including load flow analysis, contingency analysis, short circuit analysis, motor start analysis, and many others.

Meanwhile, a security assessment of a power system refers to the analysis and quantification of the degree and risk in a power system's ability to survive imminent disturbances (contingencies) without interruption to customer service. The security assessment of a power system is often based on the results of power system simulations. These simulations rely on the power system models to predict system performance (e.g., stability) during anticipated disturbance events. Optimistic power system models can result in grid under-investment or unsafe operating conditions and ultimately widespread power outages. On the other hand, pessimistic power system models and assumptions can result in overly conservative grid operation and under-utilization of network capacity. Pessimistic models can also lead to unnecessary capital investment, thereby increasing the cost of electric power. Therefore, realistic models are needed for ensuring reliable and economic power system operation.

There are always evolving changes in the characteristics of the power grid over time, particularly with respect to loads. The integration of renewable energy sources has further complicated this matter. While renewable energy sources reduce greenhouse gas emissions, these sources rely on variable natural resources which makes power stability and estimation from power plants using the renewable energy sources more difficult. Unforeseen interactions can also occur when new control strategies are implemented through the addition of novel devices and technologies.

Simulations and assessments for grid analysis typically rely on a statically-defined power system models which do not change over time or rarely change over time. But changes to the grid happen in real-time and can fluctuate the values estimated by the power system models. Because of this, power system model estimations may not be accurate as they may be missing real-time changes in the data.

SUMMARY

The example embodiments are directed to a system which improves upon the prior art by implementing real-time changes (updates) to dynamic power system models prior to each iteration of a dynamic security assessment (DSA) of a power grid. Traditional DSA operations rely on power system models which almost never change. In this case, the power system models are referred to as "dynamic", but this refers to the dynamic behavior of the device being modeled. The model is usually a differential equation with various parameters. In the example embodiments, modifications to the parameters of the differential equation can be made in real-time based on the current measurements (and other data) associated with the power grid. As a result, the dynamic power system models are more accurate resulting in a more accurate dynamic security assessment. For example, one or more model parameters can be increased or decreased based on current conditions that are measured from a phasor measurement unit (PMU), a supervisory control and data acquisition (SCADA) system, or the like. By updating the models in real-time, an accuracy of the DSA can be improved.

Another feature of the example embodiments is that the updating of the dynamic power system models may be performed at different layers/locations within the network. This configurability enables differing levels of accuracy and robustness. For example, the updates may be performed by a data concentrator (e.g., a phasor data concentrator (PDC), an enhanced model-monitoring hub (EMH), etc.), which can perform simultaneous updates of dynamic power system models of multiple power plants. As another example, the updates may be performed in the cloud (e.g., by an ETS), which provides an additional layer of data. As another example, the updates may be performed by devices on the edge of the network (e.g., PMUs, plant controllers, etc.) As yet another example, the updates can be performed by a combination of systems at different levels of the power network. The accuracy of the updates may be improved the closer to the edge that the update is performed. When the PMUs or plant controllers perform the model updates, they can forward the updated models into the remaining nodes in the power network, for example, the PDC, the EMH, the EMS, the DSA, and the like.

In an aspect of an example embodiment, a method may include iteratively executing a dynamic security analysis (DSA) on a power grid based on a simulation of a dynamic power system model, receiving measurements from one or more sensors on the power grid, modifying one or more parameters of the dynamic power system model used in a previous iteration of the DSA based on the received measurements, simulating the modified dynamic power system model, and determining a security value of the power grid during a current iteration of the DSA based on the simulated modified dynamic power system model, and storing the determined security value in memory.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
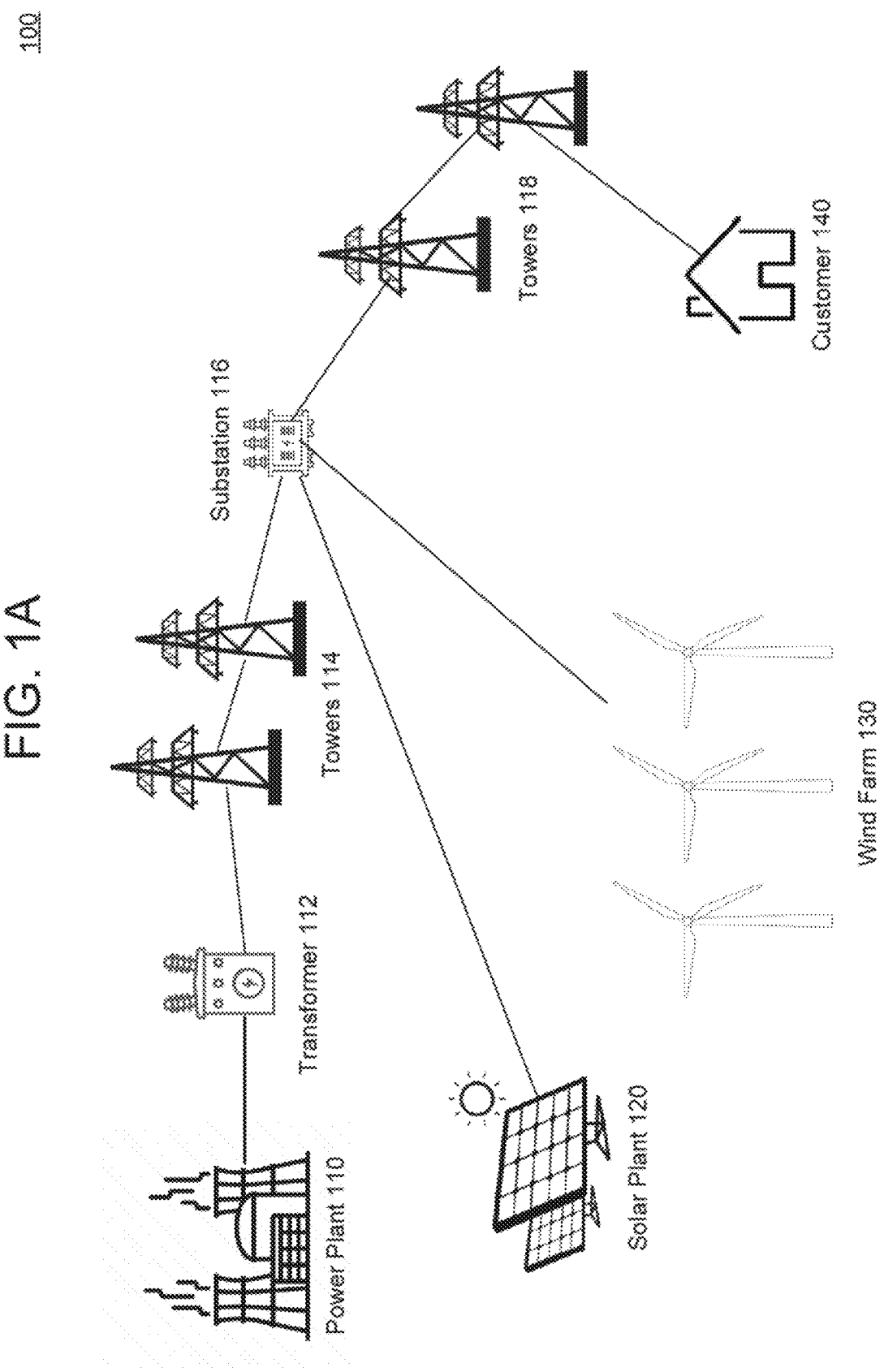
FIG. 1A is a diagram illustrating a power system for delivering electricity to a customer in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Power grid planning and operating decisions are based on the results of dynamic security assessment (DSA) simulations which rely on dynamic power system models (e.g., power flow models and dynamic models) to predict system performance during disturbance events. DSA simulations are iteratively performed (e.g., every 10 minutes, 15 minutes, etc.) The reason is that the DSA is needed to assess the scenarios that if customer services would been interrupted due to possible disturbances on the grid.

As described herein, a Dynamic Security Assessment (DSA) is an evaluation of the ability of a power system to withstand a defined set of contingencies and to survive the transition to an acceptable steady-state condition. In DSA, multiple security aspects of power systems may be assessed and values may be determined, including, but not limited to, transmission line thermal loading, voltage stability, small-signal stability, rotor angles, and frequency stability.

Similar to a steady state model, dynamic power system models are based on first principles that cannot be violated. Conservation laws, phase equilibria, heat and mass transfer, and kinetics are also applied in dynamic power state models. The most significant difference between steady state and dynamic power system simulation is that steady state assumes that variables are constant with respect to time. This means that in steady state there is no accumulation in the system so the overall mass and energy input matches its output. Conversely, dynamic power system models take into account the mass and energy rate of accumulation within the system, which allows a determination of how long it would take to reach a stable condition starting from a specified initial state.

At present, dynamic power system models are not updated as frequently as performing DSA simulations. That is, the dynamic power system models are statically defined and used for many iterations (e.g., months, years, etc.). This is largely due to historical reasons. Because of this, dynamic power system models may not reflect the exact operating status or dynamic state of the physical equipment on the grid. This situation is particularly worse for renewable power plants, as renewable generation is dynamic and relatively unpredictable. The dynamic models parameters, especially those affected by the dynamic operation state, are not timely updated in the current operation environment.

The example embodiments provide a system which can update dynamic power system models prior to each iteration of the DSA. For example, one or more parameter values within a dynamic power system model can be modified (e.g., increased, decreased, etc.) with respect to a previous iteration of the DSA based on real-time changes that are measured from the power grid. Some important control changes, such as the on or off status of AVR control, GOV control, or PSS, may be dynamically reflected in the updated dynamic power system models and passed onto DSA simulation cycle. Some key model parameters in dynamic models, such as reactive power limits, active and reactive power droop values, capability curves, are dynamic and depending on operating conditions. Those parameters may be updated timely prior to each DSA cycle as well. By updating the dynamic power system models on a real-time basis, the example embodiments improve the accuracy of the DSA results and prevent outdated models and parameters for dynamic operating conditions that can cause the DSA results to be either too conservative or too aggressive.

FIG. 1A illustrates a power delivery system 100 showing components that can facilitate the generation of power and the process of delivering power (e.g., delivering energy, electricity) to customer premises 140. Electric power can be generated at a power generation facility (power plant 110), passed to a transformer 112 and then carried by transmission power lines 114 to substations 116 having transformers. A local distribution system of smaller, lower-voltage transmission lines 118 and substations carry power to the customer premises 140. In the example of FIG. 1A, the power delivery system 100 may also include renewable sources of power including a solar plant 120 and a wind farm 130. As in the case of the power plant 110, the solar plant 120 and the wind farm 130 can generate electric power which is passed to a point on the grid (e.g., substation 116, etc.) and carried to the customer premise 140 just as the power from the power plant 110.

In the example embodiments, a variety of facilities can generate electric power including both power plants and renewable energy sources. For example, power generation facilities (e.g., power plant 110, etc.) can include power plants that burn coal, oil, or natural gas. As another example, power generation facilities can include nuclear power plants, renewable sources of energy (e.g., solar plant 120, wind farm 130, etc.) such as hydroelectric dams, wind turbines, and solar panels, and the like. The location of these power generation facilities, and their distance from end users, can vary widely.

The electricity that is generated by the power generation facilities may be stepped up or stepped down by transformers (e.g., transformer 112) which may be located at power plant substations adjacent to (and connected via power lines to) the power plant. For example, a transformer may be a step-up transformer that will "step up" the voltage of the electricity. When power travels through power lines (e.g., metallic wires that conduct electricity), some of that power is wasted in the form of heat. The power loss is proportional to the amount of current being carried. Power companies keep the current low and compensate by stepping up the voltage. After the voltage is stepped up, the electricity is typically carried over long distances by high voltage power transmission lines, typically supported and elevated by transmission towers (e.g., transmission towers 114 and 118) that can be of various dimensions, materials, and heights.

In some embodiments, the voltage may be gradually reduced by step-down transformers as the electricity approaches customer premises. Transmission substations contain step-down transformers that reduce the voltage of the electricity. The electricity can then be distributed on lower-voltage power lines. A typical transmission substation can serve tens of thousands of customers. The electricity leaving transmission substations can travel through power lines to distribution substations. Distribution substations contain step-down transformers that further reduce the voltage of electricity and distribute the power to cities and towns through main power lines, which can serve hundreds of customers. Distribution lines carry lower voltage power to clusters of homes and businesses, and are typically supported by wooden poles. Of note, power lines can also be buried under the ground. Of note, substations can contain a variety of other equipment, including switches, breakers, regulators, batteries, etc.

The voltage from a branch line can further be reduced by transformers that are mounted on poles that connect customer premises through a service drop power line. Customer premises (e.g., customer premise 140, etc.) can be of any type and variety. Customer premises can be a residential customer premises, such as residential houses. Customer premises can be an industrial customer premises, such as factories. Customer premises can be commercial customer premises, such as an office building. If a particular customer premises has a heavier load (e.g., has a higher demand for power), then a larger transformer, instead of a pole transformer, might service that particular customer premises.

Figure 1B:
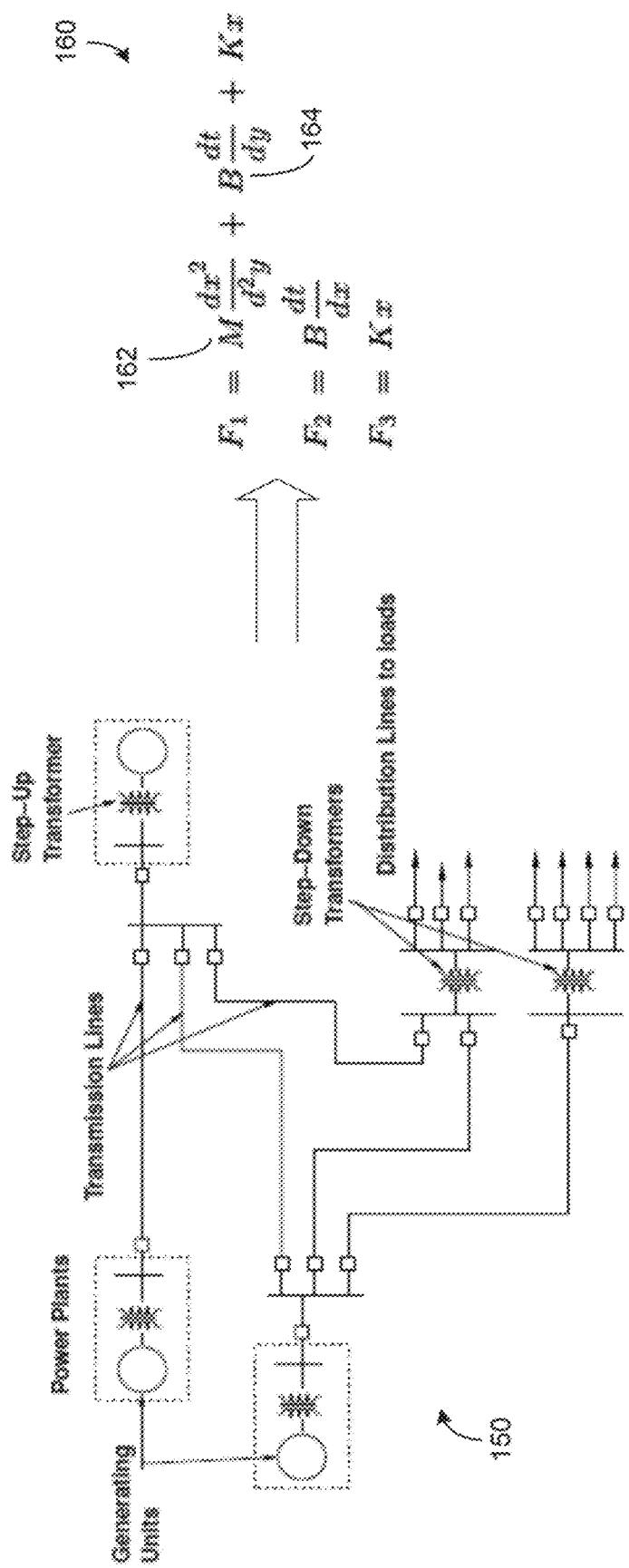
FIG. 1B is a diagram illustrating a dynamic power system model in accordance with an example embodiment.

FIG. 1B illustrates dynamic power system models 160 in accordance with an example embodiment. Referring to FIG. 1B, the dynamic power system models 160 includes three models (three equations F1, F2, and F3) which each include one or more parameters. For example, equation F1 includes parameters M, B, and K. In this example, M represents a moment of inertia. Likewise, equation F2 includes a parameter B and equation F3 includes a parameter K within the equations thereof. The dynamic power system models 160 are dynamic in that the output changes as the grid changes. However, traditionally, these parameter values do not change.

In the example embodiments, the parameters of the dynamic power system models 160 may be updated prior to each iteration of the dynamic security assessment based on changes measured on the power grid such as from PMUs, SCADA systems, etc.

Figure 2:
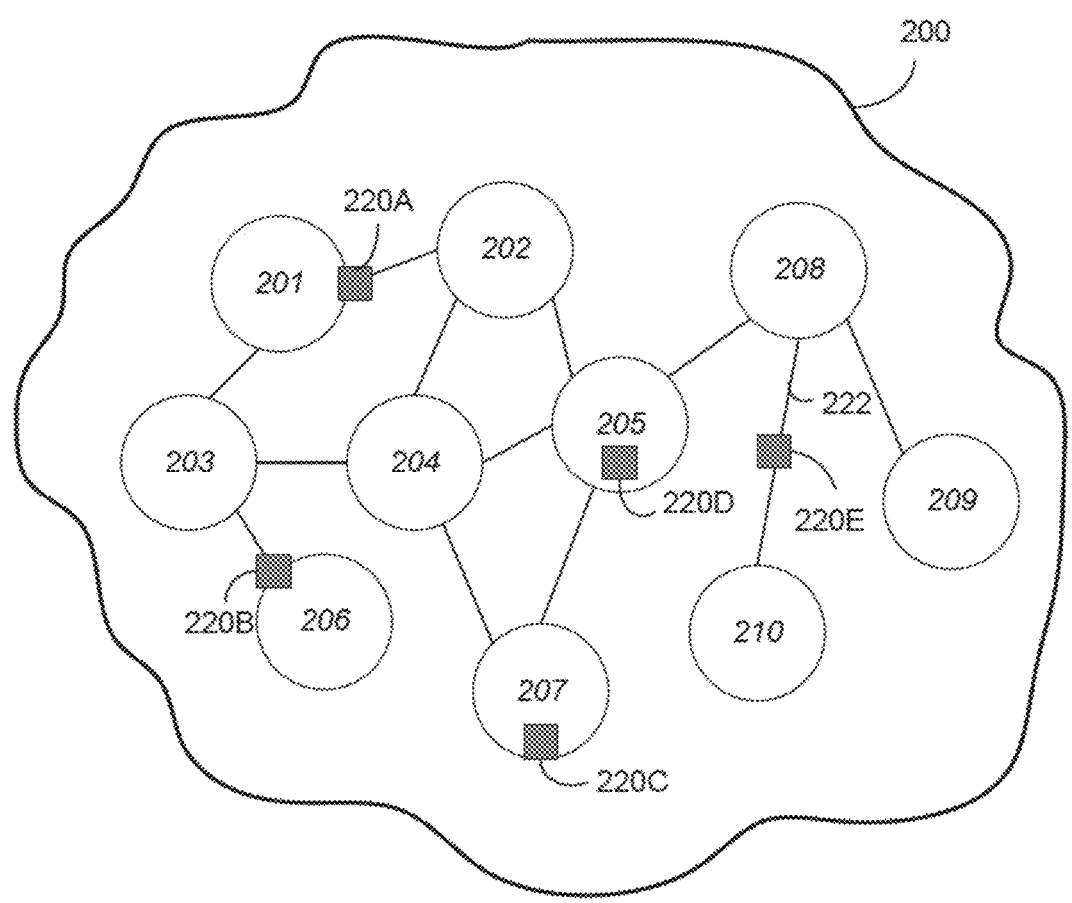
FIG. 2 is a diagram illustrating a network topology of an electrical grid.

FIG. 2 depicts an illustration of a power grid system 200 (e.g., an electrical grid) comprising multitudes of nodes 201-210. In this example, a node may represent a power generation facility, transmission substation, a distribution substation, and the like, and is intended to convey that such facilities and substations can be interconnected. In the examples herein, a node may be referred to as a "power system node." The power grid system 200 can follow a structural topology, influenced by factors such as budget, system reliability, load demand (demand for power), land, and geology. The structural topology in many cities and towns, for example many of those in North America, tends to follow a classic radial topology. This is a tree-shape network wherein power from larger voltage lines and substations radiates out into progressively lower voltage lines and substations until the customer premises are reached.

A substation receives its power from a power generation facility, and the power may be stepped down with a transformer and sent through lines that spread out in all directions across the countryside. These feeders carry three-phase power and tend to follow major streets near the substation. As the distance from the substation grows, the fanout continues as smaller laterals spread out to cover areas missed by the feeders. This tree-like structure grows outward from the substation, but a single power failure can render inoperable entire branches of the tree. For reliability reasons, there are often unused backup connections from one substation to a nearby substation. This backup connection can be enabled in case of an emergency, such that a part of a substation's service area can be fed by another substation in case of any power failure events. Redundancy allows line failures to occur and power to be rerouted while workmen restore to service damaged or deactivated components. Neighboring power utilities also typically link their grids, thereby assisting one another to maintain a balance between power generation supply and loads (e.g., customer demand). Other topologies can be mesh topologies, looped systems (mostly found in Europe) and ring networks.

The result can be an interconnected power grid system 200 that can form complex networks of power plants and transformers connected by hundreds of thousands of miles of high-voltage transmission lines. While these interconnections can be useful in situations, the danger or risk can comprise the possibility that a shutdown in one sector could rapidly spread to other sectors, leading to massive power failures in a wide area.

In the example of FIG. 2, disposed within the power grid system 200 are measurement devices 220A-220E. Throughout a power network, a variety of sensors, monitoring devices and measurement devices (collectively referred to herein as "measurement devices") can be located at one or more nodes (e.g., nodes 201-210), in between nodes on lines, and the like, and can be used to provide monitoring data related to power flow measurements, or monitor the condition of one or more aspects of a power grid system. The measurement devices 220A-220E may be deployed within, or adjacent to, power transmission components (e.g., generating units, transformers, circuit breakers), including at substations. In some examples, the measurement devices 220A-220E can also be deployed along distribution lines.

The measurement devices 220A-220E may include sensors that measure a range of parameters such as magnitude and phase angle of voltage, current, harmonic distortion, real and reactive power, power factor, and fault current. Examples of some sensors include, but are not limited to, voltage and current sensors, PMUs, transformer-Metal Insulated Semiconducting (MIS) gas in oil sensors, circuit breaker sulfur hexafluoride density sensors, conductor temperature and current sensors that record overhead transmission conductor temperatures and current magnitudes, overhead insulator leakage current sensors, Transmission Line Surge Arrester (TLSA) sensors, and the like.

In the example of FIG. 2, the power grid system 200 may include the measurement devices 220A-220E located in various parts (e.g., such as nodes) throughout the grid. The measurement devices 220A-220E can be coupled via a network of transmission lines, as well as through wireless and wired communications mediums (e.g., cellular, ethernet, etc.). For example, a measurement device 220E can be coupled via a transmission line 222 from a network of transmission lines associated with the nodes 201-210. Furthermore, a subset of the measurement devices can be associated with a sector of the power grid system 200.

In example embodiments, the reliability of the power grid system 200 can be facilitated through the use and analysis of the data received from measurement devices 220A-220E and monitoring of system conditions that are then communicated to a central control center, where a combination of automated actions and human decision assist in striving to ensure that the power grid system 200 is stable and balanced. For example, a measurement device may include a phasor measurement unit (PMU) which can capture data of a disturbance event. PMUs typically have a naming convention based on PMU information which is defined by a regional transmission authority. Meanwhile, power system nodes 201-210 have a naming convention based on utility companies. As a result, the measurement devices 220A-220E may have names that are not identical to or correlated with the names of the power system nodes 201-210. As further described herein, the system can perform automated tag mapping to correlate the measurement devices 220A-220E with corresponding power system nodes 201-210.

Among other operations, described herein is an Enhanced Disturbance Management (EDM) component (e.g., module) that is operable to read (e.g., obtain) monitoring data, for example, Supervisory Control and Data Acquisition (SCADA) system data, PMU-based data, topology data, and the like, based on power flow measurements associated with measurement devices (e.g., PMUs, current sensors, voltage sensors, etc.) connected to an electrical power system (e.g., electric power system, electrical energy system, electric energy system, power grid system, etc.), wherein the monitoring data can comprise alarm data indicative of an electrical disturbance within the electrical power system, and topology data indicative of a topology of the electrical power system. The EDM component can be operable to correlate the alarm data, which can relate to, for example, an angle disturbance alarm, or, for example, a frequency disturbance alarm, with a change in the topology data.

Figure 3:
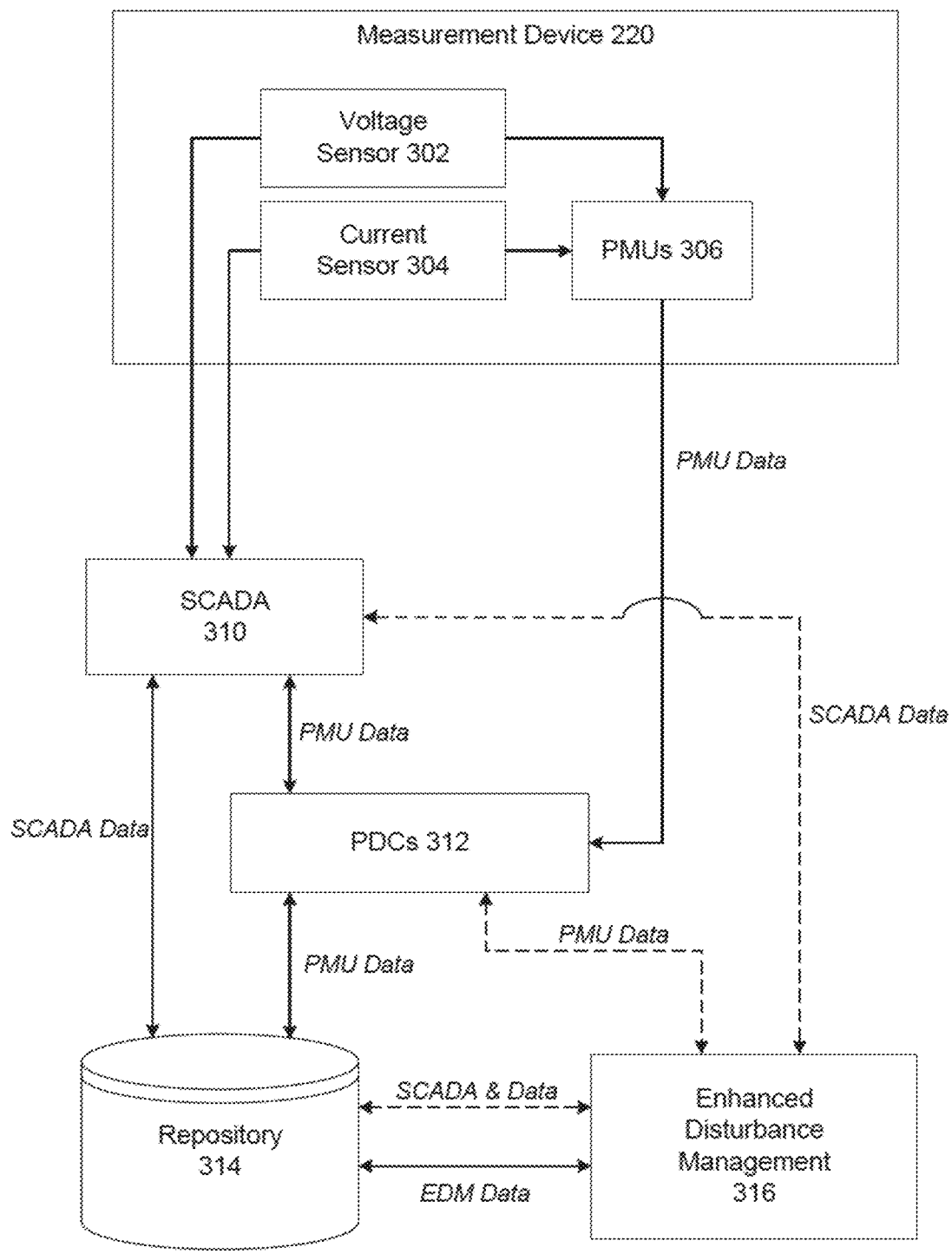
FIG. 3 is a diagram illustrating a system including an enhanced disturbance management (EDM) module.

FIG. 3 illustrates a system 300 including an EDM module 316 in accordance with an example embodiment. In this example, the EDM module 316 can determine a characterization (e.g., classification, causation) of the electrical disturbance in the power grid system based on the correlating of the alarm data with the topology data, determining a coherency level representative of the degree of correlation between the alarm data and the topology data, determining a Disturbance Impact Factor (DIF) indicative of an impact of the electrical disturbance on a location in the power grid system, and identify one or more sensors (PMUs) that have captured data of the disturbance. The EDM module 316 can further auto-map PMUs to one or more power system nodes on the grid, retrieve power model information of the power system nodes, and validate the retrieved power model based on the PMU information of the disturbance. In some embodiments, the EMD module 316 can also store and display disturbance history, event history, and a variety of other statistical information related to disturbances and events, including on a graphical user interface, or in a generated report.

Measurement device 220 in FIG. 3 can obtain, monitor or facilitate the determination of electrical characteristics associated with the power grid system (e.g., the electrical power system), which can comprise, for example, power flows, voltage, current, harmonic distortion, frequency, real and reactive power, power factor, fault current, and phase angles. Measurement device 220 can also be associated with a protection relay, a Global Positioning System (GPS), a Phasor Data Concentrator (PDC), communication capabilities, or other functionalities.

Measurement devices 220 can provide real-time measurements of electrical characteristics or electrical parameters associated with the power grid system (e.g., the electrical power system). The measurement device 220 can, for example, repeatedly obtain measurements from the power grid system (e.g., the electrical power system) that can be used by the EDM module 316. The data generated or obtained by the measurement device 220 can be coded data (e.g., encoded data) associated with the power grid system that can input (or be fed into) a traditional SCADA/EMS system. The measurement device 220 can also be a PMU that repeatedly obtains subs-second measurements (e.g., 30 times per second). Here, the PMU data can be fed into, or input into, applications (e.g., Wide Area Monitoring System (WAMS) and WAMS-related applications) that can utilize the more dynamic PMU data (explained further below).

In the example of FIG. 3, the measurement device 220 includes a voltage sensor 302 and a current sensor 304 that feed data typically via other components, to, for example, a Supervisory Control and Data Acquisition (SCADA) system (e.g., SCADA component 310). Voltage and current magnitudes can be measured and reported to a system operator every few seconds by the SCADA component 310. The SCADA component 310 can provide functions such as data acquisition, control of power plants, and alarm display. The SCADA component can also allow operators at a central control center to perform or facilitate management of energy flow in the power grid system. For example, operators can use a SCADA component (for example using a computer such as a laptop or desktop) to facilitate performance of certain tasks such opening or closing circuit breakers, or other switching operations that might divert the flow of electricity.

In some examples, the SCADA component 310 can receive measurement data from Remote Terminal Units (RTUs) connected to sensors in the power grid system, Programmable Logic Controllers (PLCs) connected to sensors in the power grid system, or a communication system (e.g., a telemetry system) associated with the power grid system. PLCs and RTUs can be installed at power plants, substations, and the intersections of transmission and distribution lines, and can be connected to various sensors, including the voltage sensor 302 and the current sensor 304. The PLCs and RTUs receive its data from the voltage and current sensors to which they are connected. The PLCs and RTUs can convert the measured information to digital form for transmission of the data to the SCADA component. In example embodiments, the SCADA component 310 can also comprise central host server or servers called master terminal units (MTUs), sometimes also referred to as a SCADA center. The MTU can also send signals to PLCs and RTUs to control equipment through actuators and switchboxes. In addition, the MTU can perform controlling, alarming, and networking with other nodes, etc. Thus, the SCADA component 310 can monitor the PLCs and RTUs, and can send information or alarms back to operators over telecommunications channels.

The SCADA component 310 can also be associated with a system for monitoring or controlling devices in the power grid system, such as an Energy Management System (EMS). An EMS can comprise one or more systems of computer-aided tools used by operators of the electric power grid systems to monitor, control, and optimize the performance of the generation or transmission system. Often, an EMS is also referred to as SCADA/EMS or EMS/SCADA. In these respects, the SCADA/EMS or EMS/SCADA can also perform the functions of a SCADA. Or, a SCADA can be operable to send data (e.g., SCADA data) to the EMS, which can in turn provide the data to the EDM module 316. Other systems with which the EDM module 316 can be associated can comprise a situational awareness system for the power grid system, a visualization system for the power grid system, a monitoring system for the power grid system or a stability assessment system for the power grid system.

The SCADA component 310 can generate or provide SCADA data (e.g., SCADA DATA shown in FIG. 3) comprising, for example, real-time information (e.g., real-time information associated with the devices in the power grid system) or sensor information (e.g., sensor information associated with the devices in the power grid system) that can be used by the EDM module 316. The SCADA data can be stored, for example, in a repository 314 (described further below). In example embodiments, data determined or generated by the SCADA component 310 can be employed to facilitate generation of topology data (topology data is further described below) that can be employed by the EDM module 316 for enhanced disturbance management, which is further described below.

The employment of current sensor 304 and voltage sensor 302 allow for fast response. Traditionally, the SCADA component 310 monitors power flow through lines, transformers, and other components relies on the taking of measurements every two to six seconds, and cannot be used to observe the dynamic characteristics of the power system because of its slow sampling rate (e.g., cannot detect the details of transient phenomena that occur on timescales of milliseconds (one 60 Hz cycle is 16 milliseconds). Additionally, although SCADA technology enables some coordination of transmission among utilities, the process can be slow, especially during emergencies, with much of the response based on telephone calls between human operators at the utility control centers. Furthermore, most PLCs and RTUs were developed before industry-wide standards for interoperability were established, and as such, neighboring utilities often use incompatible control protocols.

The measurement device 220 also includes one or more PMUs 306. A PMU 306 can be a standalone device or may be integrated into another piece of equipment such as a protective relay. PMUs 306 can be employed at substations, and can provide input into one or more software tools (e.g., WAMS, SCADA, EMS, and other applications). A PMU 306 can use voltage and current sensors (e.g., voltage sensors 302, current sensors 304) that can measure voltages and currents at principal intersecting locations (e.g., substations) on a power grid using a common time source for synchronization, and can output accurately time-stamped voltage and current phasors. The resulting measurement is often referred to as a synchrophasor (although the term synchrophasor refers to the synchronized phasor measurements taken by the PMU 306, some have also used the term to describe the device itself). Because these phasors are truly synchronized, synchronized comparison of two quantities is possible in real time, and this time synchronization allows synchronized real-time measurements of multiple remote measurement points on the grid.

In addition to synchronously measuring voltages and currents, phase voltages and currents, frequency, frequency rate-of-change, circuit breaker status, switch status, etc., the high sampling rates (e.g., 30 times a second) provides "sub-second" resolution in contrast with SCADA-based measurements. These comparisons can be used to assess system conditions-such as: frequency changes, power in megawatts (MW), reactive power in mega volt ampere reactive (MVARs), voltage in kilovolts (KV), etc. As such, PMU measurements can provide improved visibility into dynamic grid conditions and can allow for real-time wide area monitoring of power system dynamics. Further, synchrophasors account for the actual frequency of the power delivery system at the time of measurement. These measurements are important in alternating current (AC) power systems, as power flows from a higher to a lower voltage phase angle, and the difference between the two relates to power flow. Large phase angle differences between two distant PMUs can indicate the relative stress across the grid, even if the PMUs are not directly connected to each other by a single transmission line. This phase angle difference can be used to identify power grid instability, and a PMU can be used to generate an angle disturbance alarm (e.g., angle difference alarm) when it detects a phase angle difference.

Examples of disturbances that might cause the generation of an angle disturbance alarm can comprise, for example, a line out or line in disturbance (e.g., a line out disturbance in which a line that was in service has now gone out of service, or in the case of a line in disturbance, in which case a line that was out of service has been brought back into service). PMUs 306 can also be used to measure and detect frequency differences, resulting in frequency alarms being generated. As an example, unit out and unit in disturbances can result in the generation of a frequency alarm (e.g., a generating unit was in service, but might have gone out of service, or a unit that was out of service has come back in to service—both can cause frequency disturbances in the system that can result in the generation of a frequency alarm.). Still yet, PMUs 306 can also be used to detect oscillation disturbances (e.g., oscillation in the voltage, frequency, real power—any kind of oscillation), which can result in the generation of an alarm (e.g., oscillation alarm). Several other types of alarms can be generated based on PMU data from PMU based measurements. Although the disturbances mentioned (e.g., line in/out, unit in/out, load in/out) can result in angle or frequency disturbance alarms, an angle or frequency disturbance alarm might not necessarily mean that a particular type of disturbance occurred, only that it is indicative of that type of disturbance. For example, if a frequency disturbance alarm is detected, it might not necessarily be a unit in or unit out disturbance, but may be a load in or load out disturbance. The measurement requirements and compliance tests for a PMU 306 have been standardized by the Institute of Electrical and Electronics Engineers (IEEE), namely IEEE Standard C37.118.

In the example of FIG. 3, one or more Phasor Data Concentrators (PDCs) 312 are shown, which can comprise local PDCs at a substation. Here, PDCs 312 can be used to receive and time-synchronized PMU data from multiple PMUs 306 to produce a real-time, time-aligned output data stream. A PDC can exchange phasor data with PDCs at other locations. Multiple PDCs can also feed phasor data to a central PDC, which can be located at a control center. Through the use of multiple PDCs, multiple layers of concentration can be implemented within an individual synchrophasor data system. The PMU data collected by the PDC 312 can feed into other systems, for example, a central PDC, corporate PDC, regional PDC, the SCADA component 310 (optionally indicated by a dashed connector), energy management system (EMS), synchrophasor applications software systems, a WAMS, the EDM module 316, or some other control center software system. With the very high sampling rates (typically 10 to 60 times a seconds) and the large number of PMU installations at the substations that are streaming data in real time, most phasor acquisition systems comprising PDCs are handling large amounts of data. As a reference, the central PDC at Tennessee Valley Authority (TVA), is currently responsible for concentrating the data from over 90 PMUs and handles over 31 gigabytes (GBs) of data per day.

In this example, the measurement device 220, the SCADA component 310, and PDCs/Central PDCs 312, can provide data (e.g., real-time data associated with devices, meters, sensors or other equipment in the power grid system) (including SCADA data and topology data), that can be used by the EDM module 316 for enhanced disturbance management. Both SCADA data and PMU data can be stored in one or more repositories 3014. In some example embodiments, the SCADA data and PMU data can be stored into the repository 314 by the SCADA component 310, or by the PDC 412. In other embodiments, the EDM module 316 can have one or more components or modules that are operable to receive SCADA data and PMU data and store the data into the repository 314 (indicated by dashed lines). The repository can comprise a local repository, or a networked repository. The data on the repository 314 can be accessed by SCADA component 310, the PDCs 312, others systems (not shown), and optionally by example embodiments of the EDM module 316. In example embodiments, the EDM module 316 can be operable to send instructions to one or more other systems (e.g., SCADA component 310, PDCs 312) to retrieve data stored on the repository 314 and provide it to the EDM module 316. In other embodiments, the EDM module 316 can facilitate retrieval of the data stored in repository 314, directly.

In example embodiments, the data stored in the repository 314 can be associated SCADA data and PMU data. The data can be indicative of measurements by measurement device 220 that are repeatedly obtained from a power grid system. In example embodiments, the data in repository 314 can comprise PMU/SCADA-based equipment data, such as, for example, data associated with a particular unit, line, transformer, or load within a power grid system (e.g., power grid system 200). The data can comprise voltage measurements, current measurements, frequency measurements, phasor data (e.g., voltage and current phasors), etc. The data can be location-tagged. For example, it can comprise a station identification of a particular station in which a power delivery device being measured is located (e.g., "CANADA8"). The data can comprise a particular node number designated for a location. The data can comprise the identity of the measure equipment (e.g., the identification number of a circuit breaker associated with an equipment). The data can also be time-tagged, indicating the time at which the data was measured by a measurement device. The PMU/SCADA-based equipment data can also contain, for example, information regarding a particular measurement device (e.g., a PMU ID identifying the PMU from which measurements were taken).

In example embodiments, the data stored in repository 314 can comprise not only collected and measured data from various measurement devices 220, the data can also comprise data derived from that collected and measured data. The data derived can comprise topology data (e.g., PMU/SCADA-based topology data), event data, and event analysis data, and EDM data (data generated by EDM module 316).

In example embodiments, the repository 314 can contain topology data (e.g., PMU/SCADA-based topology data) indicative of a topology for the power grid system 200. The topology of a power grid system can relate to the interconnections among power system components, such as generators, transformers, busbars, transmission lines, and loads. This topology can be obtained by determining the status of the switching components responsible for maintaining the connectivity status within the network. The switching components can be circuit breakers that are used to connect (or disconnect) any power system component (e.g., unit, line, transformer, etc.) to or from the rest of the power system network. Typical ways of determining topology can be by monitoring of the circuit breaker status, which can be done using measurement devices and components associated with those devices (e.g., RTUs, SCADA, PMUs). It can be determined as to which equipment has gone out of service, and actually, which circuit breaker has been opened or closed because of that equipment going out of service.

The topology data can be indicative of an arrangement (e.g., structural topology, such as radial, tree, etc.) or a power status of devices in the power grid system. Connectivity information or switching operation information originating from one or more measurement devices 220 can be used to generate the topology data. The topology data can be based on a location of devices in the power grid system, a connection status of devices in the power grid system or a connectivity state of devices in the power grid system (e.g., devices that receive or process power distributed in throughout the power grid system, such as transformers and breakers). For example, the topology data can indicate where devices are located, and which devices in the power grid system are connected to other devices in the power grid system (e.g., where devices in the power grid system are connected, etc.) or which devices in the power grid system are associated with a powered grid connection. The topology data can further comprise the connection status of devices (e.g., a transformer, etc.) that facilitate power delivery in the power grid system, and the statuses for switching operations associated with devices in the power grid system (e.g., an operation to interrupt, energize or de-energize or connect or disconnect) a portion of the power grid system by connecting or disconnecting one or more devices in the power grid system (e.g., open or close one or more switches associated with a device in the power grid system, connect or disconnect one or more transmission lines associated with a device in the power grid system etc.). Furthermore, the topology data can provide connectivity states of the devices in the power grid system (e.g., based on connection points, based on busses, etc.).

In example embodiments, the repository 314 can contain a variety of event and event analysis data, which can be derived based on PMU data, and in some embodiments, other data as well (e.g., SCADA data, other measurement data, etc.). The data can comprise information regarding events related to the power grid system 200. An event can comprise, for example, one or more disturbances to the power grid system. A disturbance can comprise, for example, a line disturbance (e.g., line in, or line out), a unit disturbance (e.g., unit in or unit out), or load disturbance (load in or load out). For each event, relevant information such as the station where the event occurred, the voltage level associated with the station (e.g., 500 kV), the node number related to the event, the equipment related to the event, the change in real and reactive power, and change in voltage per unit for the event. The event and event analysis data can also comprise EDM data, which can be data related to events. The various data stored in the repository 314, including equipment data, topology data, event data, event analysis data, EDM data, and other data, can be inputs into the various functionalities and operations that can be performed by the EDM module 316.

Figure 4:
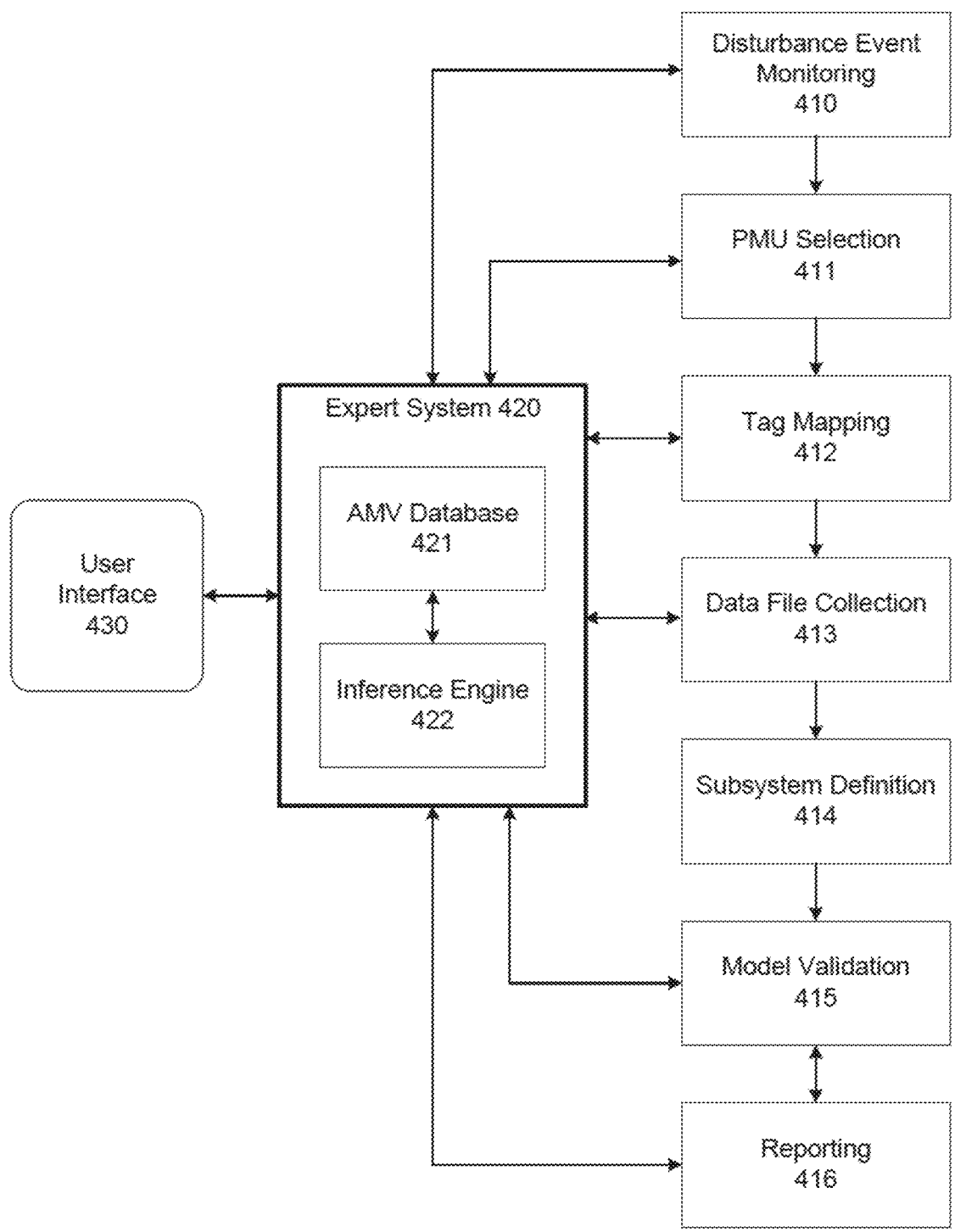
FIG. 4 is a diagram illustrating a framework for validating dynamic power system models.

FIG. 4 illustrates an Automatic Model Validation (AMV) framework 400 for validating dynamic power system models. In this example, the framework 400 may be a framework that implements or otherwise includes an EDM component such as EDM module 316 shown in FIG. 3. In this example, the AMV framework includes a disturbance event detection module 410, a PMU selection module 411, a tag mapping module 412, a data file collection module 413, a subsystem definition module 414, a model validation module 415, and a reporting module 416.

In response to an alarm, for example, when a PMU-based alarm is detected (e.g., an angle difference alarm or frequency disturbance alarm) the disturbance event detection module 410 of the EDM can respond to the alarm by correlating the alarm with the change in topology (e.g., topology data such as equipment energization status, equipment connection status, etc.) of the system that potentially gave rise to that alarm. This correlation of PMU, equipment data, and topology data can provide context to an alarm, and can be used to associate information with the event that comprises the following: a disturbance epicenter; a disturbance magnitude; a disturbance impact; and an event spread. The disturbance epicenter comprises information about the detection time of an event along with the epicenter of the event, including the exact cause (e.g., characterization) and location (e.g., localization) of the event, wherein an event can be comprised of one or more disturbances. In an event, a disturbance at one location can lead to a disturbance at another location, and so on. The disturbance event detection module 410 can attempt to determine a cause and categorize the disturbance as a line in/out, unit in/out, or load in/out, and also provide a coherency indicator that indicates how likely the disturbance is of a particular characterization. To characterize a disturbance (or determine a cause for the disturbance, classify the disturbance, etc.) PMU data can be correlated with other data, such as SCADA data, which includes topology data. PMUs are monitoring the effect of something that happened on the grid (e.g., an angle disturbance alarm or a frequency disturbance alarm). SCADA data can provide information on the topology (e.g., topology data, e.g., where the unit, line, or a transformer, and what circuit breaker is connected or involved), and how the topology reacted to a disturbance (e.g., what are the topological changes that have taken place).

The disturbance event monitoring module 410 can also provide a coherency indicator that indicates how likely the disturbance is of a particular characterization. As mentioned above, PMU-based data can result in the generation an angle disturbance alarm, and can also generate a frequency disturbance alarm. As an example, if a frequency disturbance alarm is generated, and the disturbance event monitoring module 410 correlates the PMU alarm with a change in topology that indicated that a unit has come out of service, this correlation is high because generating unit trips can cause a frequency alarm. The coherency is thus indicated as high for frequency because the PMU alarm and the topology change both match well with a cause (unit out) and effect (frequency alarm). The disturbance event monitoring module 410 can account for multiple scenarios. As another example, if a line has tripped, this disturbance will probably increase the angle separation across the line, but would not necessarily cause a frequency alarm. If an angle disturbance alarm has been generated, and the topology change shows that a line's status is that it has come out of service, the PMU angle disturbance alarm correlates highly with the topology change that took place, and thus the coherency for the angle disturbance alarm can be indicated as high.

An event can also comprise more than one disturbances, in which all the disturbances are part of one event. PMU detections (e.g., measurements) can result in the generation of alarms, and the continued generation of alarms for the same event. The disturbance event monitoring module 410 of the EDM can utilize the topology data (e.g., the equipment status, the breaker status, the topology exchanged etc.) to determine if the disturbances are part of the same event. If in the subsequent cycles the topology does not change any more, despite still receiving new alarms, then that might be an indication that the same disturbances that are resulting the continuous generation of the alarms (e.g., as opposed to different disturbances associated with a different event impacting other locations). Overlapping (e.g., correlating, overlaying) the topology changes on top of the PMU based alarms can thus be a way to validate the alarms that are coming from the PMUs; PMU based alarms would still be generated, when there really are no more disturbances after a period of time.

The information about the disturbance epicenter can be at a granularity level that comprises information regarding the epicenter of an event, for example, the disturbance type, the equipment, the circuit breaker, the name or designation of the station, the voltage level associated with the station (e.g., 500 kV), and the name or designation of the node. The information can be derived from using, for example, PMU data, SCADA Data, and topology data. As mentioned, differences in, for example, angle, frequency, etc. can inform as to whether there is a disturbance event, which might be a line in/out, unit in/out, or load in/out, each of which can lead to an impact on certain electrical parameters, comprising, for example, change in real power, reactive power, frequency, and voltage per unit. Time synchronized information reported by the measurement devices can be used to determine which equipment was impacted first in time. Topology information can be used to determine whether other equipment (including at other stations or nodes) connected with the equipment that was impacted first in time also experienced a disturbance. An event can comprise one or more disturbances. The disturbance event monitoring module 410 can use topology information and time synchronized information, to determine that several equipment all connected together experienced a disturbance, and that one equipment was impacted first, and then a second equipment connected to the first one experienced a disturbance next, then a third equipment connected to the second. By making these determinations, an epicenter—the source of the event—can be determined.

In addition to determining the characterization of a disturbance, location of a disturbance, and epicenter of a disturbance, the disturbance event monitoring module 410 can also be operable to provide a disturbance magnitude for each disturbance. At the point of each disturbance, during the transition from pre-disturbance state to post-disturbance state, disturbance magnitude information comprising information about the change in electrical parameters (e.g., a change in real power, change in reactive power, and change in voltage) can be determined by the disturbance event monitoring module 410. The magnitude information can be for the disturbance epicenter, for example. The magnitude information can also be for the most impacted PMU location, for example.

The disturbance event monitoring module 410 can also be operable to determine disturbance impact information, which can comprise information about the impact of the disturbance event at pre-specified and measured key locations in the system using a disturbance impact factor (DIF) metric, which can be a function of the change in power, voltage, real power, reactive power, and voltage, or some other parameter (e.g., electrical parameter, custom-designed parameter, etc.) with reference to the point of disturbance. The DIF reflects the impact of each disturbance in an event on a PMU location (based on user defined weights and steady-state changes in the power system parameters during the disturbance), and can be derived, for example, by using the example equation below:

$$DIF_{PMU\,Bus\,i} = W_1 * \frac{\Delta P_{PMU\,Bus\,i}}{\Delta P_{Disturbance\,Bus\,i}} + W_2 * \frac{\Delta Q_{PMU\,Bus\,i}}{\Delta Q_{Disturbance\,Bus\,i}} + W_3 * \frac{\Delta V_{PMU\,Bus\,i}}{\Delta V_{Disturbance\,Bus\,i}}$$

In this equation, the $DIF_{PMU}$ Bus i is the disturbance impact factor associate with a particular PMU. It is calculated, for example, by multiplying weighting factor W1 multiplied against the change in real power of the PMU over the change in real power of the disturbance location, added to a weighting factor W2 multiplied against a change in quality Q at the PMU over the change in quality at the disturbance location, added to a weighting factor W3 multiplied against a change in voltage at the PMU over the change in voltage of the disturbance location. Each of the weighting factors W1, W2, and W3 can be set (e.g., set by a power systems operator). Again, other factors can be accounted for when calculating a disturbance impact factor, which can depend on customer or user choice or design.

The disturbance event monitoring module 410 can also be operable to determine event spread information. Event spread information can comprise information about the spread or scope of the event (e.g., whether the event is a local event or a wide area event). A local event can be an event wherein only one location (e.g., one substation) is impacted, whereas a wide-spread event can be an event in which multiple locations have been impacted. Event spread information can also include information as to whether the event involves different types of equipment (e.g., a line and a load simultaneously, etc.).

When a new event (comprising of one or more disturbances) takes place, each new disturbance may be appended to an event history archive in a chronological manner, which can enable a post-event analysis to be performed. The information archived for each disturbance can be as follows: event detection time; correlation of system topological disturbances in the event with PMU-based alarms; disturbance type, location, and magnitude; most impacted location (amongst the pre-specified list of key locations) due to the disturbance.

According to various embodiments, the PMU selection module 411 may select or otherwise identify PMUs on the electrical grid which are affected by a disturbance event. For example, the PMU selection module 411 may identify PMUs that see adequate disturbance information which can be used for performing model validation of a device (generator, transmission system, load, etc.) which is associated with the PMU. For each of the selected PMUs, the PMU selection module 411 may determine whether there is a need to proceed to model validation. For example, the PMU selection module 411 may compare a disturbance impact factor of a selected PMU to a predefined threshold. In this example, if the DIF is greater than the threshold, the PMU selection module 411 may select the PMU (and its related device(s) as a candidate for model validation. As another example, the PMU selection module 411 may execute a machine learning algorithm to compare the features of the event and the associated network topology with features of existing events in a database. Here, if the similarity is high enough, the PMU selection module 411 may determine the need for model validation.

When the PMUs associated with the disturbance event have been identified, the tag mapping module 412 may correlate a tag of an identified PMUs with a tag of one or more power system nodes on the electrical grid. Normally, a unique generator may be uniquely defined by both the generator name and the name of the station it is directly tied to. The needs for a tag mapping function arises from the potentially different naming conventions from three different entities. Typically, the names of power system nodes such as generators, substations, etc., are defined by a generator owner (GO), while their corresponding names in the EMS are defined by the utilities. Meanwhile, the names of the PMU and related substation/generators are defined by a third party-regional transmission owner (RTO), which is more recently than the previous two. The name convention for power system node tags in EMS is typically limited in size (e.g., 8 bits, etc.), while the names in the RTO's PMU database tends to have more flexibility allowing for larger-sized tag names. In this case, there may be three different names for one generator in the three different databases: utility's EMS, Generator Owner's asset database and RTO's PMU database. Because the names are different, the PMU tags must be mapped to power system node tags to associate the event disturbance data captured by the PMU with one or more elements on the power grid (generator, substation, etc.). The tag mapping module 412 of the example embodiments performs an automated tag-mapping process to automatically associated the selected PMUs with corresponding subsystems on the electrical grid.

According to one example, the auto tag mapping process from EMS system to RTO's PMU database is described here. after the identification of grid event and selection of PMU and the affected station from EMS (as described in step 410 and 411 in FIG. 4), Substation names may be retrieved for the EMS system, and PMU names may be retrieved from a RTO's PMU database. Name variants of the generator and the station may be generated for pairs by the tag mapping module 412 based on a database or predefined location dictionary. The name variants are also called name augmentation. The augmented name may then be correlated to the names in the ROT's PMU database based on the word, term and contextual association between word and terms. The similarity-based metrics such as cosine similarity between the word and terms can be used. A correlation vector may be used for each pair of PMU and EMS system, and the highest correlated matched pair is the mapping result. Other approaches like rule-based inference, fuzzy logic can also be used to facilitate the mapping decision. Results of the tag mapping may be output to the user interface 430 to enable a user to review and correct mapping results. Furthermore, mapped pairs may be added to a database (e.g., AMV database 420) for future use.

The data file collection module 413 may establish connections with existing databases and retrieve naming information, dynamic power system model information, network topology information, and the like, which can be used by the different components of the EDM shown in FIG. 4. For example, FIG. 5 shows an example of an architecture of a file collection system (AMV module 536) which further includes elements from the EDM incorporated therein for performing automated dynamic power system model validation. In this example, the AMV module 536 may include or otherwise be connected to the file collection system 413 shown in FIG. 4.

The subsystem definition module 414 may carve out which subsystems (generators, substations, etc.) should have dynamic power system models validated. Here, the subsystem module 414 may carve out and identify the subsystems based on PMU selection and tag mapping that is performed by the PMU selection module 411 and the tag mapping module 412. Furthermore, the dynamic power system models collected by the file collection unit 413 may associated with the subsystems for validation and calibration.

In this example, the model validation module 415 may automatically determine whether a dynamic power system model of a subsystem (power system node) is valid. For example, the model validation module 415 may receive disturbance data monitored by one or more PMUs coupled to an electrical power distribution grid may be received. The disturbance data can include voltage ("V"), frequency ("f"), and/or active and nonactive reactive ("P" and "Q") power measurements from one or more points of interest (POI) on the electrical power grid. A playback simulation using default model parameters and existing transient simulation software can be performed. These default parameters can be the current parameters incorporated in the dynamic power system model. The current parameters can be stored in a model parameter record. The simulation can be done by a power system simulation engine, including GE PSLF, Power Tech TSAT and Siemens PIT PSS/E, to perform a real-time power system simulation scenario.

The model validation module 415 may also comprise of the model calibration unit with three functionalities. The first functionality is an event screening tool to select characteristics of disturbance event from a library of recorded event data. This functionality clusters similar events and determines the set of most representative events from the available measurements. The second functionality is a preconditioning tool for the parameter identifiability study. When implementing this functionality, a global quantification of parameter sensitivity magnitude and dependency will be achieved. The third functionality is a tool for simultaneous tuning of models using an augmented event comprised of multiple events.

In accordance with some embodiments, event screening can be implemented during the simulation to provide computational efficiency. If hundreds of events are stitched together and fed into the calibration algorithm unselectively, the algorithm may not be able to converge. To maintain the number of events manageable and still keep an acceptable representation of all the events, a screening procedure may be performed to select the most characteristic events among all. Depending on the type of events, the measurement data could have different characteristics. For example, if an event is a local oscillation, the oscillation frequency in the measurement data would be much faster as compared to an inter-area oscillation event. In some implementations, a K-medoids clustering algorithm can be utilized to group events with similar characteristic together, thus reducing the number of events to be calibrated.

The results of the simulated default model performance can be compared by the model validation module 415 to actual disturbance data measured on the power system. If the default model performance is within (e.g., equal to or less than) a predetermined threshold of accuracy (e.g., specified by, for example, power system operators, designers, etc.), the model validation module 415 can end parameter conditioning and wait for disturbance data from a subsequent event.

If the default model performance is outside of the predetermined threshold, a parameter identifiability algorithm may be performed. In accordance with some embodiments, the parameter identifiability analysis can determine the differing effects that various parameters can have on a dynamic power system model. In some implementations, each parameter can represent a factor/coefficient in a term of a polynomial expression representing the dynamic power system model. To decide which parameters of the dynamic power system model are the best choice to tune, a parameter sensitivity study may be performed. The sensitivity study can vary the value of the parameter, compare the dynamic power system model result to monitored data, and then determine the perturbation's magnitude caused by the variation in parameter value. To calculate the model's sensitivity to each parameter, playback simulation is conducted with the value of that parameter perturbed upward and downward. The difference in the model's performance (i.e., when compared to the measured disturbance data) between the up, and the down perturbation yields the trajectory sensitivity matrix.

The parameter identifiability analysis addresses two aspects: (a) magnitude of sensitivity of output to parameter change; and (b) dependencies among different parameter sensitivities. For example, if the sensitivity magnitude of a particular parameter is low, the parameter would appear in a row being close to zero in the parameter estimation problem's Jacobian matrix. Also, if some of the parameter sensitivities have dependencies, it reflects that there is a linear dependence among the corresponding rows of the Jacobian. Both these scenarios lead to singularity of the Jacobian matrix, making the estimation problem infeasible. Therefore, it may be important to select parameters which are highly sensitive as well as result in no dependencies among parameter sensitivities. Next, parameter values in the active dynamic power system model may be updated, and the system may generate a report and/or display of the estimated parameter values(s), confidence metrics, and the model error response as compared to the measured data.

The reporting module 416 may notify a user (via user interface 430) of the validity of a dynamic power system model that is determined by the EDM system. For example, the reporting module 416 may notify that a dynamic power system model is valid, invalid, and the like. As another example, the reporting module 416 can provide additional information about a dynamic power system model. For example, the reporting module 416 may provide an update (to one or more parameters) of the dynamic power system model to be accepted by the user via the user interface 430. In this case, the reporting module 416 can retrieve updated parameter information from the model validation module 415 and provide those to the user interface 430 to efficiently update a dynamic power system model on behalf of a user.

In some embodiments, the model validation module 415, the reporting module 416, or the like, from the system 400 may provide subscription services for other entities such as GOs, TSOs, RTOs, and the like. The subscription services may provide calibration information, tag-mapping information, PMU information, and the like, to the other systems that operate and have interest in the electrical power grid.

The system shown in FIG. 4 further includes an expert system 420 which includes an automated model validation (AMV) database 421 and an inference engine 422. The AMV database 421 may store information that is collected by the EDM such as disturbance information (DIF, PMU selection, tag dictionaries, etc.). Furthermore, reports and results generated by the model validation module 415 may be stored there as well. The inference engine 422 may query a calibrated case and reuse a subsystem, which are stored in the AMV database 421.

In some embodiments, the inference engine 422 may analyze a parameter change for a mapped power system node and adjust a threshold for the power system node to thereby update a dynamic power system model associated therewith. The update may be determined based on a DIF of a PMU associated with the power system node. The inference engine 422 may provide rules, a knowledge base, and a learning algorithm for tag mapping between selected PMU tags and power system node tags. The inference engine 422 may provide an initial value and other information to accelerate the model validation and calibration. In some embodiments, the inference engine 422 may extract event (disturbance) features, cluster events using similarity with previously detected events, and update clusters based on newly received event information.

Figure 5A:
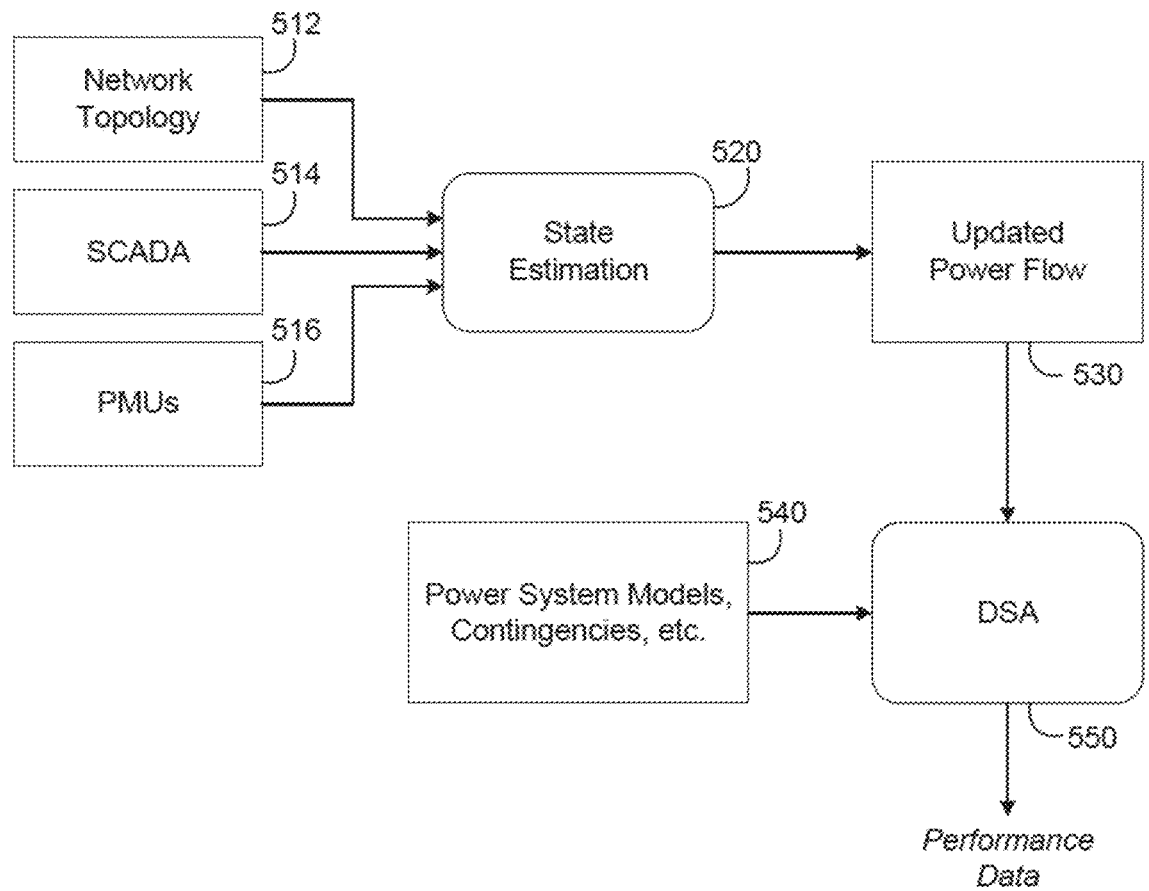
FIG. 5A is a diagram illustrating a dynamic security assessment process based on statically-defined dynamic power system models in accordance with an example embodiment.

FIG. 5A illustrates a dynamic security assessment process 500A based on statically-defined dynamic power system models in accordance with an example embodiment. In the example of FIG. 5A, the dynamic power system models remain statically-defined (i.e., they are not updated). Each iteration of a DSA simulation includes both a steady state analysis and future/transient analysis. Here, a state estimation module 520 receives a network topology 512 and sensor data captured from the grid during the current iteration (e.g., SCADA data 514, PMU data 516, etc.). Based on the received/measured information, the state estimation module 520 identifies the power conditions on the grid under normal conditions. The result is an updated power flow 530 output from the state estimation module 520. The updated power flow 530 represents the power of the grid under normal operating conditions. The updated power flow 530 is fed as an input into a DSA module 550.

In addition, dynamic power system models and contingencies 540 are also fed into the DSA module 550. Here, the DSA module 550 simulates the dynamic power system models to predict a future state of the power grid and applies the contingencies (disturbances) to the combination of the current state of the power grid and the simulated state of the power grid to identify a security value of the grid for the current iteration of the DSA. A report, visualization, etc., may be output via a user interface of a device provide a user with a view of the security analysis performed by the DSA module 550.

A previously noted, the dynamic power system models are referred to as "dynamic" because they describe the dynamic behavior of a device that it is modeling versus a model which represents static behavior such as a power flow. Dynamic means it is a differential equation describing the behavior including changes in time series. However, in FIG. 5A, the underlying algorithm (differential equation) that is used to describe the dynamic behavior of the device remains the same at each iteration of the DSA.

Figure 5B:
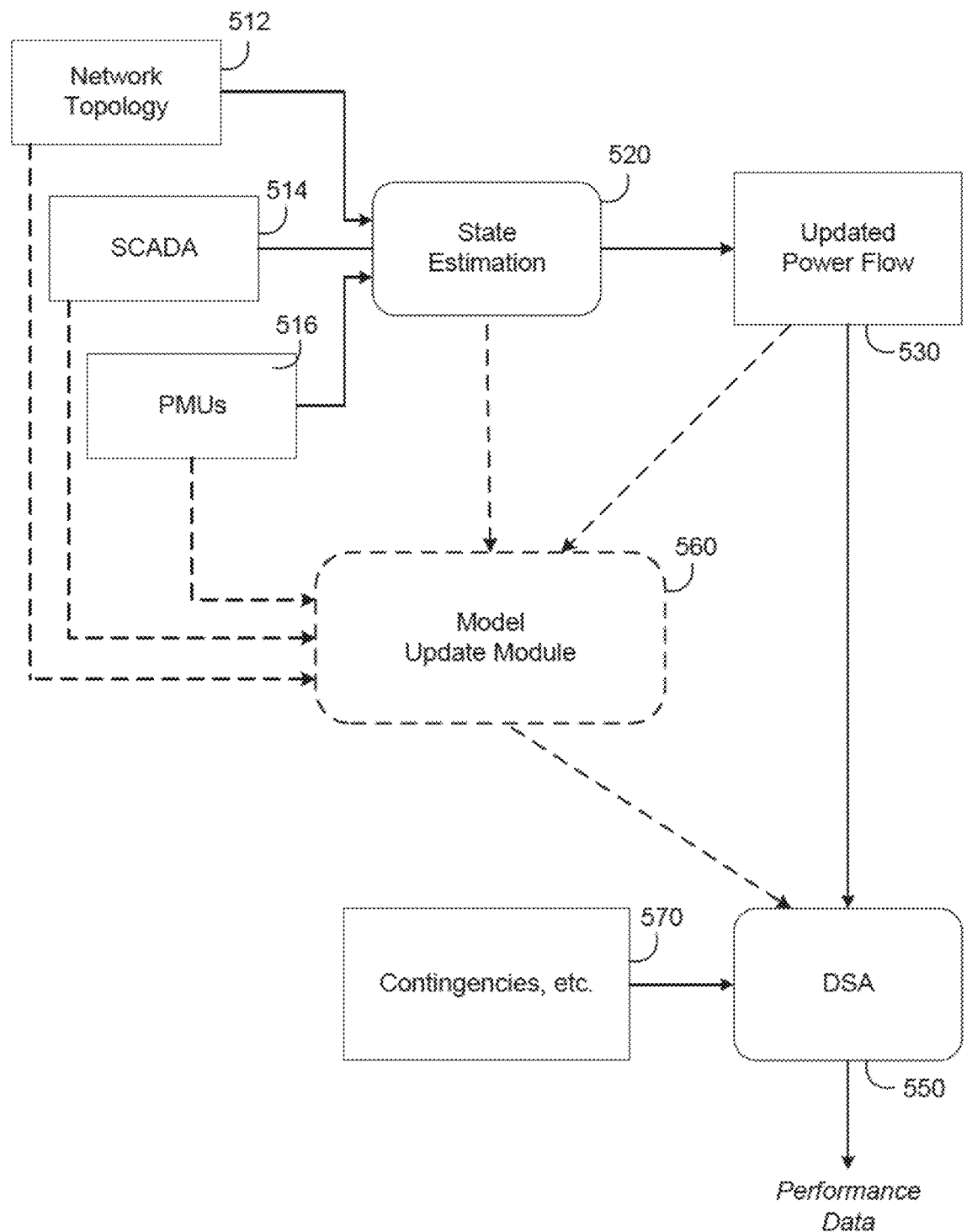
FIG. 5B is a diagram illustrating a dynamic security assessment process based on real-time updates to dynamic power system models in accordance with an example embodiment.

FIG. 5B illustrates a dynamic security assessment process 500B based on real-time updates to dynamic power system models in accordance with an example embodiment. In contrast to the process 500A shown in FIG. 5A, in FIG. 5B, the dynamic power system models are modified/updated during each iteration of the DSA process. In this example, each iteration of a DSA simulation includes both the steady state analysis and the future/transient analysis. Just as in the example of FIG. 5A, the state estimation module 520 receives the network topology 512 and sensor data captured from the grid during the current iteration. Based on the received information, the state estimation module 520 identifies the power conditions on the grid under normal conditions. The result is an updated power flow 530 output from the state estimation module 520. The updated power flow 530 is fed as an input into a DSA module 550.

However, in this example, one or more dynamic power system models are modified with respect to an immediately previous iteration of the DSA analysis. Here, a model update module 560 receives data from one or more of the sensors (SCADA 514, PMUs 516, the state estimation 520, and the updated power flow 530, and modifies the one or more dynamic power system models based on the current conditions of the grid. For example, the modification may include modifying a parameter of an equation by increasing or decreasing the parameter. The overall equations may remain the same. However, by tweaking the parameters, the conditions on the grid can be more accurately reflected. For example, natural resources that provide energy sources to renewables may change significantly over the course of a few minutes, an hour, a day, etc. Therefore, the model fidelity of these energy sources may not be as consistent as a non-renewable energy source such as a coal-based power plant. By dynamically updating the dynamic power system models, the example embodiments can more accurately capture the reliability of the grid during the DSA analysis.

Here, the updated dynamic power system model(s) is fed from the update module 560 to the DSA module 550. Likewise, the contingencies 570 (which are still statically-defined) are also fed to the DSA module 550. The DSA module 550 simulates the dynamically updated dynamic power system model(s) to predict a future state of the power grid and applies the contingencies (disturbances) to the combination of the current state of the power grid and the simulated state of the power grid to identify one or more security values of the grid for the current iteration of the DSA. A report, visualization, etc., may be output via a user interface of a device provide a user with a view of the security analysis performed by the DSA module 550.

In the example of FIG. 5B, the dynamic power system models are not statically defined, but instead are updated at each iteration of the DSA. In this example, the update module 560 is able to update model parameters of different power system models associated with different power plants. The updating can take different data sources and modify the parameters in the model. The number of parameters being updated can be different. Different data may be used to modify different parameters of the power model. Here, the more data that is used the more accurate the update may be. In the example of FIG. 5B, data can be used from many of the components. The update module may use data from any and/or all of these sources to update the power system model. In some cases, the system may only use the PMU, but that is not the only example.

Figure 6:
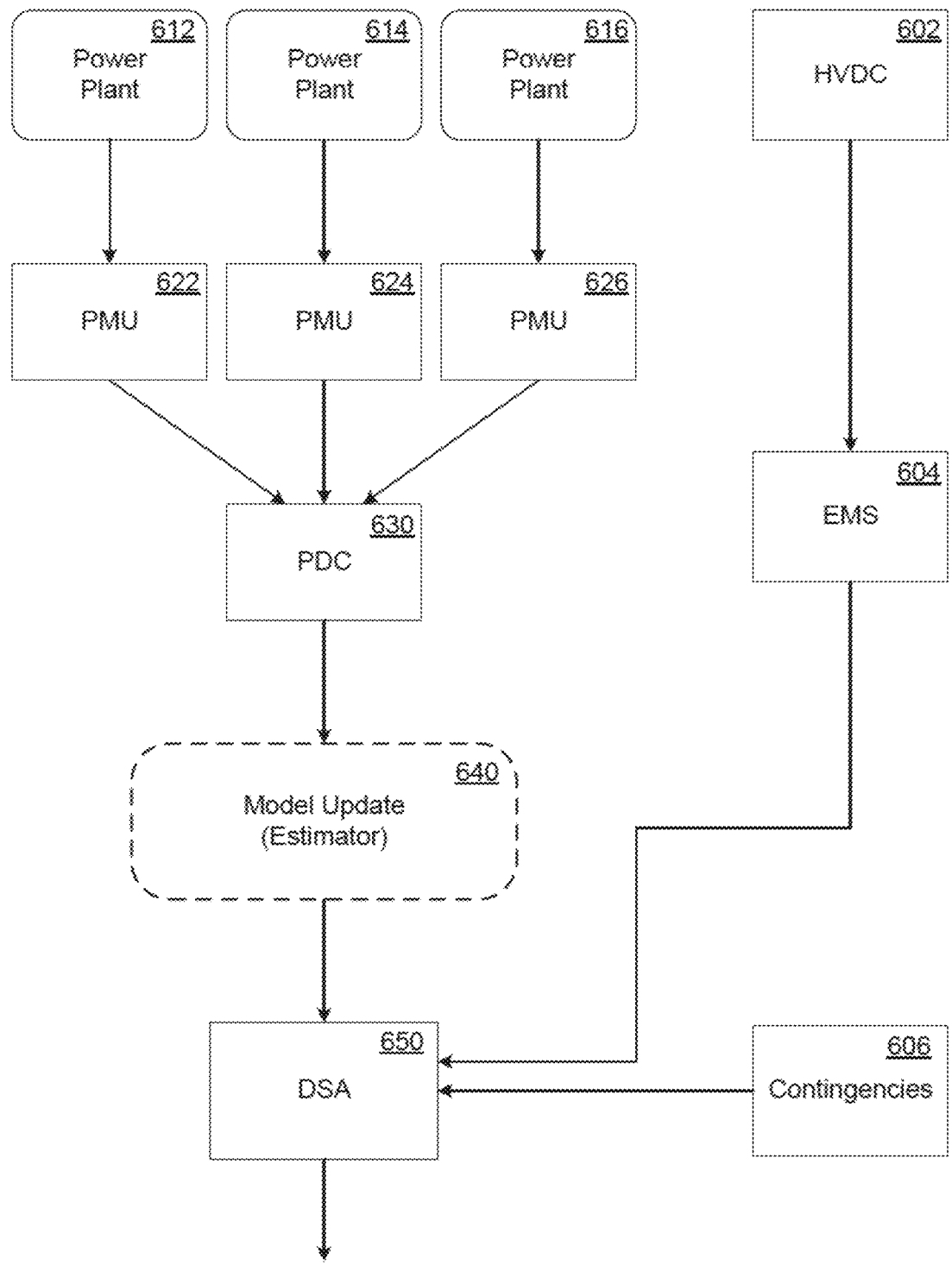
FIG. 6 is a diagram illustrating a process of updating dynamic power system models in accordance with an example embodiment.
Figure 7:
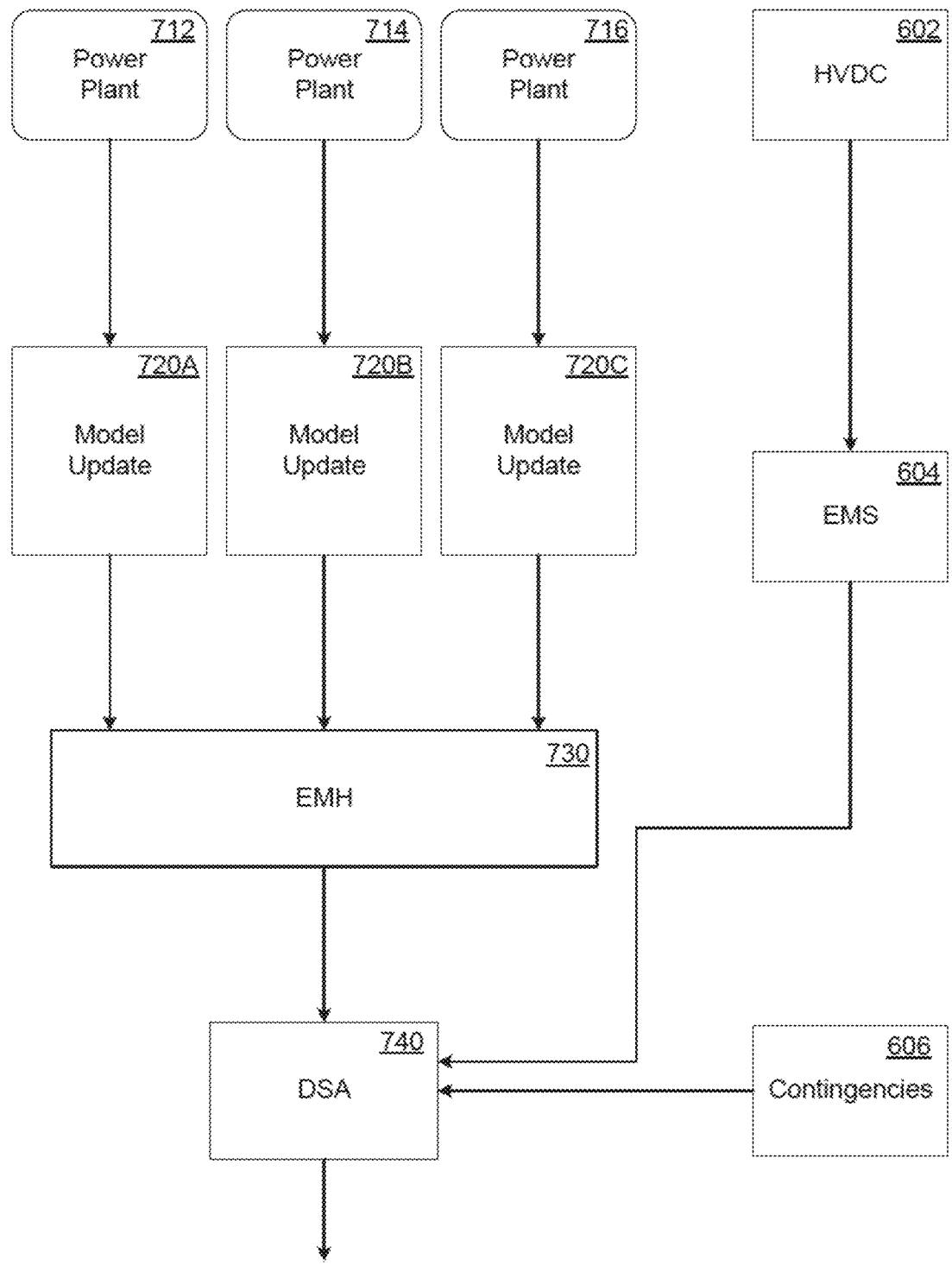
FIG. 7 is a diagram illustrating a process of updating dynamic power system models in accordance with another example embodiment.
Figure 8:
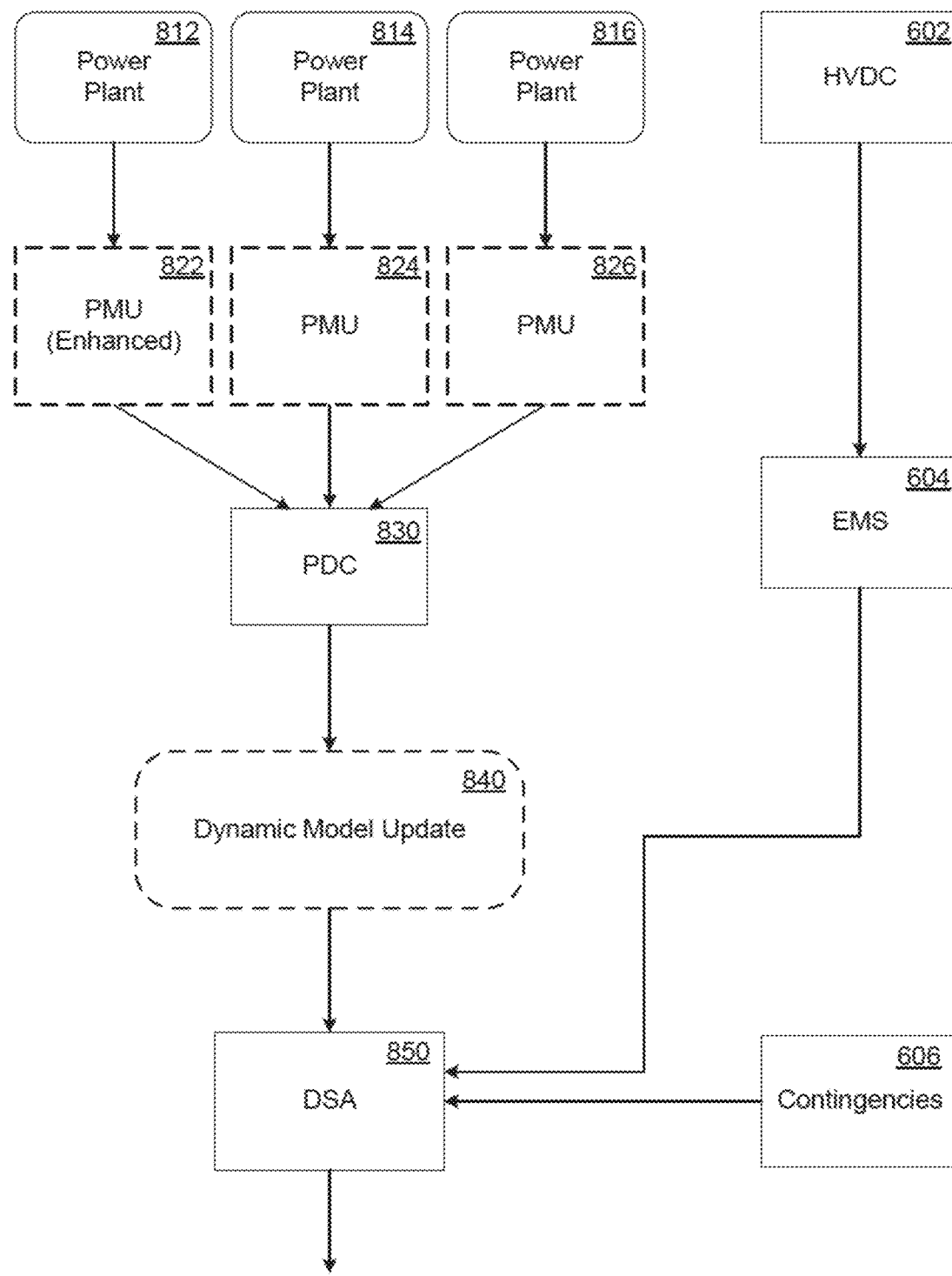
FIG. 8 is a diagram illustrating a process of updating dynamic power system models in accordance with yet another example embodiment.

FIGS. 6, 7, and 8 illustrate different processes for updating dynamic power system models in accordance with example embodiments. FIG. 6 is a more detailed example of what is being shown in FIG. 5B. In the example of FIG. 6, a process 600 of updating the dynamic power system models is performed via a model update module 640 that is positioned at a node that includes a PDC 630 and/or a DSA 650 module is shown. The PDC 630 typically concentrates/aggregates data from multiple PMUs 622, 624, and 626, which are receiving data from power plants 612, 614, and 616, respectively. Here, FIG. 6 is more detailed construction of FIG. 5B. In this example, the PMU data from PMUs 622, 624, and 626 may be gathered by the PDC 630 and the PDC 630 may perform the model update via the model update module 640. The dynamic power system models being updated in FIG. 6 by the PDC 630 (via the model update module 640) could be dynamic power system models of devices at any of the power plants 612, 614, and 616. This enables a single entity to update dynamic power system models of multiple power plants. In this example, the contingencies 606 remain static and are fed to the DSA 650.

The model update module 640 may perform an update to the dynamic power system models based on data collected from across all power plants 612-616, sensors (PMUs, SCADAs, etc.), and the like. The model update module 640 is positioned at a same level as an EMS system 604 which receives data from a transmission system such as a high voltage direct current (HVDC) module 602. The PDC 630 receives and time-synchronizes phasor data from multiple phasor measurement units (PMUs) 622-626 to produce a real-time, time-aligned output data stream. The PDC 630 can exchange phasor data with PDCs at other locations. Through use of multiple PDCs, multiple layers of concentration can be implemented within an individual synchrophasor data system.

Meanwhile, FIG. 7 illustrates a process 700 in which the dynamic power system models are updated via a model update modules 720A, 720B, and 720C, that are positioned at or near a plant level (e.g., power plants 712-716). In this example, the transmission system 602, the EMS 604, and the contingencies 606 are the same. However, the model update modules 720A-720C may be positioned closer to the power plants 712-716, respectively, such as at a plant central controller, PMU, or the like. Each of the module update modules 720A-720C may perform dynamic power system model updates for power system models at individual power plants, respectively. This is another layer below the example it could be closer to the power plant at a terminal of the power plant near the power plant or at the power plant itself. It could be the plant central controller or a PMU like a generator close to the power plant. Here, more sensors and more measurements can be used to determine the model update than in FIG. 6, thereby increasing the accuracy of the models. The simulated results from executing the updated dynamic power system models may be fed to an EMH 730 for combining, and then to a DSA module 740 for a security assessment of the power grid including the power plants 712-716. The EMH 730 may be an intelligent data and models acquisition server that collects energy data and model information from different sources (e.g., meters, sensors, etc.) via wired and/or wireless connections. The EMH can provide a user interface enabling a user to control data collection. In this example, the EMH 730 can forward the collected energy data and updated models to the DSA module 740.

Meanwhile, FIG. 8 illustrates a process 800 in which the dynamic power system models are updated via individual devices (e.g., enhanced PMUs, upgraded plant controller, or any other type of devices) 822, 824, and 826 located at individual power plants 812, 814, and 816, respectively. In this example, the transmission system 602, the EMS 604, and the contingencies 606 are the same. However, each device 822-826 may include its own module update module that is integrated therein or attached thereto, and that is configured to update the dynamic power system models of a particular power plant, rather than all of the power plants at once. In addition, a second dynamic module update module 840 may collect the updated dynamic power system models from the PMU devices 822, 824, and 826, and provide them to the DSA module 850.

The model update module described herein may perform estimations of the power grid by turning various attributes on/off. For example, an estimator included within the model update module may turn on/off a power system stability (PSS) functionality on the power grid. As another example, the estimator may turn on/off an automatic voltage regulator (AVR), turn on/off a governor function on a turbine, compensate for droop change, or the like. The estimator may update a model state based on the results of these changes. Also, model parameters may be updated, such as frequency droop parameters, reactive power limits, PI controller parameters, and the like.

For example, a PMU may be monitoring a solar power plant, which uses active power as the base of frequency droop setting, and PMU data streams to EMS system. In EMS system, every 5 to 15 mins, the power production of this solar power plant, updated by PMU data, or SCADA data, or State Estimation results at EMS, will be used to update its frequency droop parameter Ddn and Dup, qmin and qmax, parameters in its dynamic model REPC_A or REPC_B models. The algorithm to update Ddn and Dup two parameters are based on the actual droop setting (Droop %), the updated active power (Prt), and the plant's MVA base value (MVA). The algorithm to update qmin and qmax two parameters are based on the actual plant Reactive Power Capability curve (a nonlinear function FUN), the updated active power (Prt), the updated voltage (Vrt), and the plant's MVA base value (MVA).

$$Ddn = 1/\text{Droop} * Prt/\text{MVA}$$

$$Dun = -1/\text{Droop} * Prt/\text{MVA}$$

$$q\text{min} = \text{FUN}(Prt, Vrt)/\text{MVA}$$

$$q\text{max} = \text{FUN}(Prt, Vrt)/\text{MVA}$$

As another example, a solar plant may use active power as the base of frequency droop setting. The power production quantities were monitored and controlled by EMS system. In the EMS system, every 5 to 15 mins, the power production of this solar power plant will be used to update its frequency droop parameter Ddn and Dup in its dynamic model REPC_A or REPC_B models.

In the examples of FIGS. 7 and 8, additional processes may be performed. For example, the model update may be performed based on shunt device statuses, AVR control mode change data, and BESS charging status and availability status data. In the example of FIG. 8, the model update may further be performed based on disturbance-based model validation and calibration.

Figure 9:
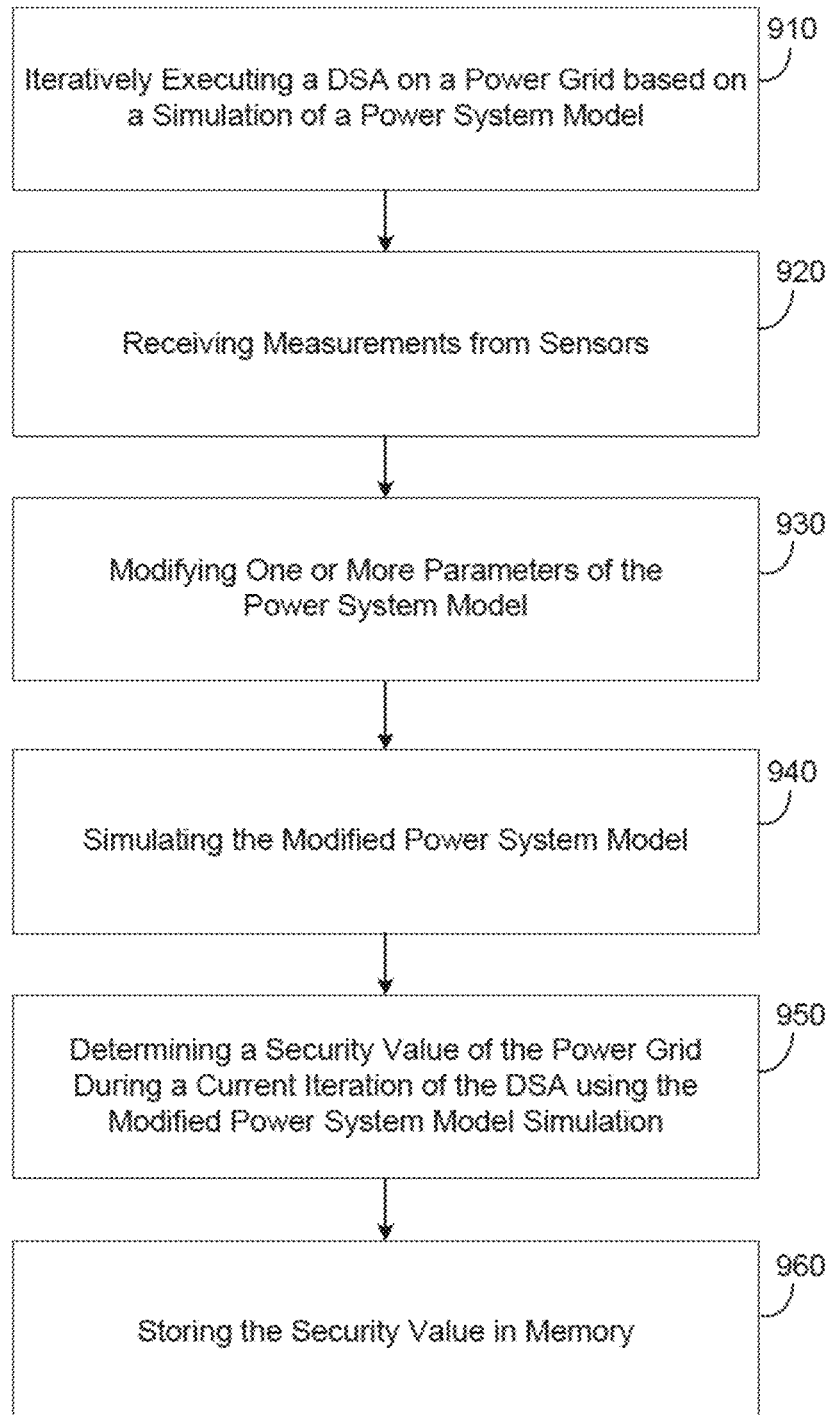
FIG. 9 is a diagram illustrating a method of performing a dynamic security assessment using dynamically updated dynamic power system models in accordance with an example embodiment.

FIG. 9 is a diagram illustrating a method 900 of performing a dynamic security assessment using dynamically updated dynamic power system models in accordance with an example embodiment. For example, the method 900 may be performed by a computing system such as a server, a user device, an asset controller, a database, a cloud platform, and the like. Referring to FIG. 9, in 910, the method may include iteratively executing a dynamic security analysis (DSA) on a power grid based on a simulation of a dynamic power system model. The DSA analysis may be performed at periodic instances, for example, every 5 minutes, every 10 minutes, every 15 minutes, and the like. The DSA may analyze the security of the power grid to handle potential issues.

In 920, the method may include receiving measurements from one or more sensors on the power grid. For example, the measurements may be received from hardware sensors embedded within the power grid such as one or more of a phasor measurement unit (PMU), a digital fault recorder (DFR), an advanced metering infrastructure (AMI), and a supervisory control and data acquisition (SCADA). The measurement data may include steady state and dynamic state information for the power plants, load and transmission system data, a power grid topology, load forecasting for the grid, power generation forecasting for the grid, weather forecasting for a geographical area which includes the grid, and non-power system variables such as social events. In these examples herein, a power plant may include be based on steam power, gas power, nuclear power, hydro power, wind power, solar power, fuel cell power, and the like.

In 930, the method may include modifying one or more parameters of the dynamic power system model used in a previous iteration of the DSA based on the received measurements. The modification may be used to increase or decrease one or more parameters of the dynamic power system model (e.g., of a differential equation) to reflect the real-time conditions of the power grid as detected from the measurements received in 920. The update dynamic power system model may be transmitted to one or more other nodes on the power grid as well.

In 940, the method may include simulating the modified dynamic power system model, and in 950, the method may include determining a security value of the power grid during a current iteration of the DSA based on the simulated modified dynamic power system model. Furthermore, in 960, the method may include storing the determined security value in memory. For example, the security value that is determined in 950 may include a value for one or more of transmission line thermal loading, voltage stability, small-signal stability, rotor angles, frequency stability, and the like. Steps 920, 930, 940, 950, and 960 may be repeatedly performed each iteration of the DSA analysis such that each iteration performs the DSA based on real-time conditions of the power grid, rather than static dynamic power system models.

In some embodiments, the method may further include outputting information about the determined security value to one or more of a display device and a power grid management application. In this example, the outputting may include outputting the security value information along with other characteristics to a user interface. Here, the user interface may include a graph, a chart, a grid topology, and other data. As another example, the determined stability may be transmitted to another application such as a power grid management application which may include an automatic protection system (including remedial action scheme), economic dispatch, optimal power flow (OPF), automatic generation control (AGC), or the like.

In some embodiments, the determining the stability of the power grid during the current iteration may further be performed based on an updated power flow on the power grid and updated disturbance contingencies on the power grid since a most recent iteration of the DSA. In some embodiments, the receiving may include receiving one or more of state data of a power plant, a power grid topology, predicted load data, predicted power generation data, and non-power system variables.

In some embodiments, the method may further include verifying the one or more modified parameters of the dynamic power system model based on a simulated response or a measured response of the power grid. In some embodiments, the modifying may include determining a modification to one or more model parameters based on a machine learning model executed on the measurements received from the one or more sensors on the power grid. In some embodiments, the modifying may include simultaneously modifying, via a phasor data concentrator (PDC), parameters of a plurality of dynamic power system models in a coordinated manner corresponding to a plurality of different power plants, respectively.

In some embodiments, the modifying may include modifying, via a phasor measurement unit (PMU), one or more parameters of a dynamic power system model of the PMU, and transmitting the modified dynamic power system model of the PMU to one or more upstream nodes in the power grid. In some embodiments, the modifying may include modifying the one or more parameters of the dynamic power system model via an energy management system (EMS) of the power grid which is integrated within a cloud platform.

In some embodiments, the modifying process may be conducted through a model validation and calibration module such as shown an described with respect to FIG. 4. For example, the model parameters may be verified and adjusted (if needed) by matching the simulated response with the measured response. In some embodiments, the modifying process may be conducted through a machine learning algorithm and a database. The database has data pairs wherein the measurement data and the model parameters are mapped. Based on the real measured data, the model parameters can be inferred by either supervised learning (neural network) or unsupervised learning (such as clustering) based on the measurement data. In some embodiments, the model parameters may be updated/modified by a user or based on rules that have been previously established by a user, such as a subject matter expert. For example, the update module described herein may output a user interface which includes input fields capable of receiving modified parameter values for dynamic power system models. Here, the user can submit the input values in the fields causing the parameters to be changed. As another example, rules may be established that automatically adjust (increase/decrease) parameter values in the model based on certain conditions.

In some embodiments, the method may include estimating changes to the power grid based on an on state and an off state of a power system stabilizer (PSS) on the power grid, and further modifying the one or more parameters of the dynamic power system based on the estimated changes to the power grid based on the PSS. As another example, the method may include estimating changes to the power grid based on an on state and an off state of an automatic voltage regulator (AVR) on the power grid, and further modifying the one or more parameters of the dynamic power system based on the estimated changes to the power grid based on the AVR. As another example, the method may include estimating changes to the power grid based on an on state and an off state of a governor of a turbine on the power grid, and further modifying the one or more parameters of the dynamic power system based on the estimated changes to the power grid based on the governor of the turbine.

In the example embodiments, the modifying may include increasing or decreasing reactive power limits in the power system model based on the received measurements. As another example, the modifying may include increasing or decreasing droop values in the power system model based on the received measurements. As another example, the modifying may include modifying capability curves of the power system model based on the received measurements.

Figure 10:
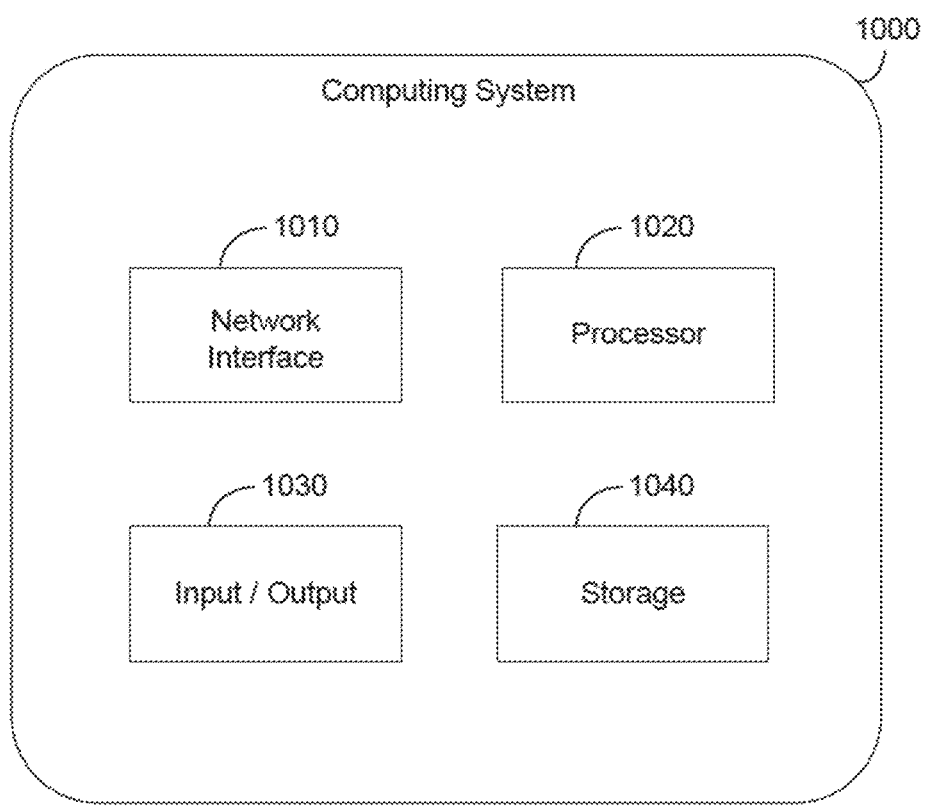
FIG. 10 is a diagram illustrating a computing system for use in the examples herein in accordance with an example embodiment.

FIG. 10 illustrates a computing system 1000 that may be used in any of the methods and processes described herein, in accordance with an example embodiment. For example, the computing system 1000 may be a database node, a server, a cloud platform, or the like. In some embodiments, the computing system 1000 may be distributed across multiple computing devices such as multiple database nodes. Referring to FIG. 10, the computing system 1000 includes a network interface 1010, a processor 1020, an input/output 1030, and a storage device 1040 such as an in-memory storage, and the like. Although not shown in FIG. 10, the computing system 1000 may also include or be electronically connected to other components such as a display, an input unit(s), a receiver, a transmitter, a persistent disk, and the like. The processor 1020 may control the other components of the computing system 1000.

The network interface 1010 may transmit and receive data over a network such as the Internet, a private network, a public network, an enterprise network, and the like. The network interface 1010 may be a wireless interface, a wired interface, or a combination thereof. The processor 1020 may include one or more processing devices each including one or more processing cores. In some examples, the processor 1020 is a multicore processor or a plurality of multicore processors. Also, the processor 1020 may be fixed or it may be reconfigurable. The input/output 1030 may include an interface, a port, a cable, a bus, a board, a wire, and the like, for inputting and outputting data to and from the computing system 1000. For example, data may be output to an embedded display of the computing system 1000, an externally connected display, a display connected to the cloud, another device, and the like. The network interface 1010, the input/output 1030, the storage 1040, or a combination thereof, may interact with applications executing on other devices.

The storage device 1040 is not limited to a particular storage device and may include any known memory device such as RAM, ROM, hard disk, and the like, and may or may not be included within a database system, a cloud environment, a web server, or the like. The storage 1040 may store software modules or other instructions which can be executed by the processor 1020 to perform the method shown in FIG. 9. According to various embodiments, the storage 1040 may include a data store having a plurality of tables, records, partitions and sub-partitions. The storage 1040 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

The invention claimed is:

1. A method comprising:
providing a periodic interval including a first time and a second time, wherein a dynamic security analysis (DSA) is iteratively executed for a plurality of consecutive periodic intervals;
executing a first DSA on a power grid based on a simulation of a first dynamic power system model, wherein the execution of the first DSA is at the first time of a first periodic interval;
receiving, after execution of the first DSA, measurements from one or more sensors on the power grid;

automatically generating a modified dynamic power system model by modifying in real-time one or more parameters of the first dynamic power system model used by the first DSA, the modification including a real-time automatic rule-based increase or a real-time automatic rule-based decrease of at least one or more parameters in the first dynamic power system model, wherein the rule-based increase or the rule-based decrease is an effect of turning on/off an automatic voltage regulator (AVR) of the power grid which alters the one or more parameters of a voltage in the model, and wherein the real-time automatic rule-based increase or the real-time automatic rule-based decrease of the at least one or more parameters occurs in response to a detected condition;

wherein:
the modification is at a time between the first time of the first periodic interval and the second time of the first periodic interval;
the modification is performed at two or more layers within a power system network;

executing a second DSA on the power grid at the second time of the first periodic interval, wherein execution of the second DSA includes simulating the modified dynamic power system model;

determining a security value of the power grid during execution of the second DSA based on a current state of the power grid and the simulated modified dynamic power system model, wherein the security value of the power grid is a measure of a stability of the power grid with respect to surviving pre-defined disturbances without interruption to power grid service, and the security value includes a value of one or more of transmission line thermal loading, voltage stability, small-signal stability, rotor angles, and frequency stability;

storing the determined security value in memory;

receiving the determined security value directly at a power grid management application, the power grid management application including an automatic protection system: and automatically physically opening and closing circuit breakers by the automatic protection system to alter a flow of power, via the power grid management application, based on the determined security value.

2. The method of claim 1, further comprising outputting information about the determined security value to a display device and the power grid management application.

3. The method of claim 1, wherein the determining the security value of the power grid during the execution of the second DSA is further performed based on an updated power flow on the power grid and updated disturbance contingencies on the power grid since execution of the first DSA.

4. The method of claim 1, wherein the receiving comprises receiving sensor data from hardware sensors on the power grid which include one or more of a phasor measurement unit (PMU), a digital fault recorder (DFR), an advanced metering infrastructure (AMI), and a supervisory control and data acquisition (SCADA).

5. The method of claim 1, wherein the receiving comprises receiving one or more of state data of a power plant, a power grid topology, predicted load data, predicted power generation data, and non-power system variables.

6. The method of claim 1, further comprising verifying the one or more modified parameters of the dynamic power system model based on a simulated response or a measured response of the power grid.

7. The method of claim 1, wherein the modifying comprises determining a modification to one or more model parameters based on a machine learning model executed on the measurements received from the one or more sensors on the power grid.

8. The method of claim 1, wherein the modifying comprises simultaneously modifying, via a phasor data concentrator (PDC), parameters of a plurality of dynamic power system models corresponding to a plurality of different power plants, respectively.

9. The method of claim 1, wherein the modifying comprises modifying, via a phasor measurement unit (PMU), one or more parameters of a dynamic power system model of the PMU, and transmitting the modified dynamic power system model of the PMU to one or more upstream nodes in the power grid.

10. The method of claim 1, wherein the modifying comprises modifying the one or more parameters of the dynamic power system model via an energy management system (EMS) of the power grid which is integrated within a cloud platform.

11. The method of claim 1, further comprising:
receiving, after execution of the second DSA, measurements from one or more sensors on the power grid;
automatically generating a second modified dynamic power system model by modifying in real-time one or more parameters of the modified dynamic power system model used by the second DSA;
wherein the second modification is at a time between the first time of a second periodic interval and the second time of the second period interval, the second periodic interval immediately following the first periodic interval;
executing a third DSA on the power grid at the second time of the second periodic interval, wherein execution of the third DSA includes simulating the second modified dynamic power system model;
determining the security value of the power grid during execution of the third DSA based on the current state of the power grid and the simulated second modified dynamic power system model.

12. An apparatus comprising:
a memory; and
a processor configured to
provide a periodic interval including a first time and a second time, wherein a dynamic security analysis (DSA) is iteratively executed for a plurality of consecutive periodic intervals;
execute a first DSA on a power grid based on a simulation of a first dynamic power system model, wherein the execution of the first DSA is at the first time of a first periodic interval;
receive, after execution of the first DSA, measurements from one or more sensors on the power grid;
automatically generate a modified dynamic power system model by modifying in real-time one or more parameters of the first dynamic power system model used by the first DSA, the modification including a real-time automatic rule-based increase or a real-time automatic rule-based decrease of at least one or more parameters in the first dynamic power system model, wherein the rule-based increase or the rule-based decrease is an effect of turning on/off an automatic voltage regulator (AVR) of the power grid which alters the one or more parameters of a voltage in the model, and wherein the real-time automatic rule-based increase or the real-time automatic rule-based decrease of the at least one or more parameters occurs in response to a detected condition;
wherein:
the modification is at a time between the first time of the first periodic interval and the second time of the first periodic interval;
the modification is performed at two or more layers within a power system network;
execute a second DSA on the power grid at the second time of the first periodic interval, wherein execution of the second DSA includes simulation of the modified dynamic power system model;
determine a security value of the power grid during execution of the second DSA based on a current state of the power grid and the simulated modified dynamic power system model, wherein the security value of the power grid is a measure of a stability of the power grid with respect to surviving pre-defined disturbances without interruption to power grid service, and the security value includes a value of one or more transmission line thermal loading, voltage stability, small-signal stability, rotor angles, and frequency stability;
store the determined security value in the memory;
transmit the determined security value directly to a power grid management application, the power grid management system including an automatic protection system; and
automatically physically open and close circuit breakers by the automatic protection system to alter a flow of power, via the power grid management application, based on the determined security value.

13. The apparatus of claim 12, wherein the processor is further configured to output information about the determined security value to one or more of a display device and the power grid management application.

14. The apparatus of claim 12, wherein the processor is configured to receive sensor data from hardware sensors on the power grid which include one or more of a phasor measurement unit (PMU), a digital fault recorder (DFR), an advanced metering infrastructure (AMI), and a supervisory control and data acquisition (SCADA).

15. The apparatus of claim 12 wherein the processor is further configured to receive measured data from one or more of state data of a power plant, a power grid topology, predicted load data, predicted power generation data, and non-power system variables.

16. The apparatus of claim 12, wherein the processor is further configured to verify the one or more modified parameters of the dynamic power system model based on a simulated response or a measured response of the power grid.

17. The apparatus of claim 12, wherein the processor is configured to determine a modification to one or more model parameters based on a machine learning model executed on the measurements received from the one or more sensors on the power grid.

18. The apparatus of claim 12, wherein the processor is configured to simultaneously modify, via a phasor data concentrator (PDC), parameters of a plurality of dynamic power system models corresponding to a plurality of different power plants, respectively.

19. The apparatus of claim 12, wherein the processor is configured to modify, via a phasor measurement unit (PMU), one or more parameters of a dynamic power system model of the PMU, and transmit the modified dynamic power system model of the PMU to one or more upstream nodes in the power grid.

20. A non-transitory computer-readable medium comprising instructions which when executed by a processor cause a computer to perform a method comprising:
providing a periodic interval including a first time and a second time wherein a dynamic security analysis (DSA) is iteratively executed for a plurality of consecutive periodic intervals;
executing a first DSA on a power grid based on a simulation of a first dynamic power system model, wherein the execution of the first DSA is at the first time of a first periodic interval;
receiving, after execution of the first DSA, measurements from one or more sensors on the power grid;
automatically generating a modified dynamic power system model by modifying in real-time one or more parameters of the first dynamic power system model used by the first DSA, the modification including a real-time automatic rule-based increase or a real-time automatic rule-based decrease of at least one or more parameters in the first dynamic power system model, wherein the rule-based increase or the rule-based decrease is an effect of turning on/off an automatic voltage regulator (AVR) of the power grid which alters the one or more parameters of a voltage in the model, and wherein the real-time automatic rule-based increase or the real-time automatic rule-based decrease of the at least one or more parameters occurs in response to a detected condition;
wherein:
the modification is at a time between the first time of the first periodic interval and the second time of the first periodic interval;
the modification is performed at two or more layers within a power system network;
executing a second DSA on the power grid at the second time of the first periodic interval, wherein execution of the second DSA includes simulating the modified dynamic power system model;
determining a security value of the power grid during execution of the second DSA based on a current state of the power grid and the simulated modified dynamic power system model, wherein the security value of the power grid is a measure of a stability of the power grid with respect to surviving pre-defined disturbances without interruption to power grid service, and the security value includes a value of one or more transmission line thermal loading, voltage stability, small-signal stability, rotor angles, and frequency stability;
storing the determined security value in memory;
transmitting the determined security value directly to a power grid management application, the power grid management application include an automatic protection system; and
automatically physically opening and closing circuit breakers by the automatic protection system to alter a flow of power, via the power grid management application, based on the determined security value.

* * * * *